United States Patent
Newman et al.

(10) Patent No.: US 11,522,637 B2
(45) Date of Patent: Dec. 6, 2022

(54) SELECTION OF FAULTED MESSAGE ELEMENTS BY MODULATION QUALITY IN 5G/6G

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palos Verdes Estates, CA (US)

( * ) Notice: Subject to any disclaimer, the term of this patent is extended or adjusted under 35 U.S.C. 154(b) by 0 days.

(21) Appl. No.: 17/848,828

(22) Filed: Jun. 24, 2022

(65) Prior Publication Data

US 2022/0321253 A1    Oct. 6, 2022

Related U.S. Application Data

(63) Continuation of application No. 17/579,749, filed on Jan. 20, 2022, now Pat. No. 11,469,856.
(Continued)

(51) Int. Cl.
*H04L 1/00* (2006.01)
*H04B 17/18* (2015.01)
(Continued)

(52) U.S. Cl.
CPC ........... *H04L 1/0026* (2013.01); *H04B 17/17* (2015.01); *H04B 17/18* (2015.01); *H04B 17/29* (2015.01);
(Continued)

(58) Field of Classification Search
CPC ... H04L 1/0003; H04L 1/0061; H04L 1/0026; H04L 43/0829; H04L 27/34; H04L 1/206
See application file for complete search history.

(56) References Cited

U.S. PATENT DOCUMENTS 7,535,338 B2   5/2009  Frederick
8,874,477 B2 * 10/2014 Hoffberg ............... H04W 16/28
                                                        705/37
(Continued)

FOREIGN PATENT DOCUMENTS

CN    107431596        12/2017
EP    3435557 A1 *    1/2019   ............ H04B 10/11
(Continued)

*Primary Examiner* — Diane L Lo
*Assistant Examiner* — Abusayeed M Haque
(74) *Attorney, Agent, or Firm* — Mayer & Williams PC

(57) ABSTRACT

Wireless receivers in 5G and 6G are generally configured to discard faulted messages and request retransmission of the entire message. Disclosed is a procedure enabling the receiver to determine which specific message elements are faulted, and then to request only the faulted portion be retransmitted. Substantial time and wasted power can thereby be saved. The receiver can identify the faulted message element(s) by calculating a modulation quality of each message element and specifying only that portion of the message containing those message elements. For example, the receiver can determine the modulation quality by comparing a difference between the message element's amplitude or phase modulation and the closest predetermined amplitude or phase level of the modulation scheme. A deviation larger than a threshold value strongly suggests that the message element is wrong. The SNR and other factors can also be included in a formula to identify faulted message elements.

20 Claims, 9 Drawing Sheets

Related U.S. Application Data

(60) Provisional application No. 63/282,770, filed on Nov. 24, 2021, provisional application No. 63/281,847, filed on Nov. 22, 2021, provisional application No. 63/281,187, filed on Nov. 19, 2021, provisional application No. 63/280,281, filed on Nov. 17, 2021, provisional application No. 63/230,926, filed on Aug. 9, 2021, provisional application No. 63/159,195, filed on Mar. 10, 2021, provisional application No. 63/159,238, filed on Mar. 10, 2021, provisional application No. 63/157,090, filed on Mar. 5, 2021, provisional application No. 63/151,270, filed on Feb. 19, 2021.

(51) Int. Cl.
| | |
|---|---|
| *H04L 43/0829* | (2022.01) |
| *H04L 27/34* | (2006.01) |
| *H04L 1/20* | (2006.01) |
| *H04B 17/17* | (2015.01) |
| *H04B 17/29* | (2015.01) |
| *H04B 17/336* | (2015.01) |
| *H04W 76/18* | (2018.01) |
| *H04L 1/08* | (2006.01) |
| *H04L 5/00* | (2006.01) |

(52) U.S. Cl.
CPC ......... *H04B 17/336* (2015.01); *H04L 1/0003* (2013.01); *H04L 1/0015* (2013.01); *H04L 1/0061* (2013.01); *H04L 1/08* (2013.01); *H04L 1/206* (2013.01); *H04L 5/0053* (2013.01); *H04W 76/18* (2018.02); *H04L 43/0829* (2013.01)

(56) References Cited

U.S. PATENT DOCUMENTS

| | | | |
|---|---|---|---|
| 9,818,136 B1 * | 11/2017 | Hoffberg | ................. G07F 17/32 |
| 10,374,756 B2 | 8/2019 | Fong | |
| 2007/0089036 A1 | 4/2007 | Jiang | |
| 2007/0089037 A1 | 4/2007 | Jiang | |
| 2009/0046771 A1 | 2/2009 | Abe | |
| 2010/0097939 A1 | 4/2010 | Yoneta | |
| 2011/0069707 A1 * | 3/2011 | Roh | ..................... H04L 27/2071 |
| | | | 370/392 |
| 2012/0139460 A1 * | 6/2012 | Senkou | ................... H02P 21/20 |
| | | | 318/400.04 |
| 2012/0311409 A1 | 12/2012 | Pedersen | |
| 2013/0163656 A1 | 6/2013 | Sakamoto | |
| 2013/0346826 A1 | 12/2013 | Zopf | |
| 2014/0376358 A1 | 12/2014 | Eder | |
| 2015/0139350 A1 | 5/2015 | Sugihara | |
| 2015/0146806 A1 * | 5/2015 | Terry | ..................... H04L 5/001 |
| | | | 375/260 |
| 2015/0340045 A1 * | 11/2015 | Hardwick | ............ G10L 19/018 |
| | | | 704/205 |
| 2016/0080109 A1 | 3/2016 | Lee | |
| 2016/0233989 A1 | 8/2016 | Belghoul | |
| 2017/0019210 A1 | 1/2017 | Yu | |
| 2017/0134193 A1 | 5/2017 | Sugihara | |
| 2017/0288912 A1 | 10/2017 | Rahmati | |
| 2017/0311300 A1 | 10/2017 | Stanwood | |
| 2017/0331734 A1 | 11/2017 | Wang | |
| 2019/0059062 A1 * | 2/2019 | Mulligan, IV | ...... H04W 52/228 |
| 2019/0353368 A1 | 11/2019 | Gillette | |
| 2020/0052832 A1 | 2/2020 | Tian | |
| 2020/0177319 A1 | 6/2020 | Cariou | |
| 2020/0272567 A1 * | 8/2020 | Gans | ................... G06F 12/0862 |
| 2020/0344007 A1 | 10/2020 | Chen | |
| 2020/0366409 A1 | 11/2020 | Xu | |
| 2020/0394090 A1 | 12/2020 | Urban | |
| 2021/0014018 A1 | 1/2021 | Noh | |
| 2021/0250049 A1 | 8/2021 | Gabrys | |
| 2021/0273651 A1 | 9/2021 | Haftbaradaran | |
| 2021/0328598 A1 | 10/2021 | Annamraju | |
| 2021/0345169 A1 | 11/2021 | Cariou | |
| 2021/0352053 A1 * | 11/2021 | Melodia | ..................... H04L 63/1475 |
| 2021/0383207 A1 | 12/2021 | Beery | |
| 2022/0188013 A1 * | 6/2022 | Woo | ..................... G11C 7/1057 |

FOREIGN PATENT DOCUMENTS

| | | | | |
|---|---|---|---|---|
| WO | WO-2016115483 A2 * | 7/2016 | .......... | G10L 19/018 |
| WO | WO-2022026397 A1 * | 2/2022 | .............. | H04L 1/18 |
| WO | WO-2022045080 A1 * | 3/2022 | .............. | H04L 1/00 |

* cited by examiner

SELECTION OF FAULTED MESSAGE ELEMENTS BY MODULATION QUALITY IN 5G/6G

PRIORITY CLAIMS AND RELATED APPLICATIONS

This application is a continuation of U.S. patent application Ser. No. 17/579,749, entitled "Retransmission of Selected Message Portions in 5G/6G", filed Jan. 20, 2022, which claims the benefit of U.S. Provisional Patent Application Ser. No. 63/151,270, entitled "Wireless Modulation for Mitigation of Noise and Interference", filed Feb. 19, 2021, and U.S. Provisional Patent Application Ser. No. 63/157,090, entitled "Asymmetric Modulation for High-Reliability 5G Communications", filed Mar. 5, 2021, and U.S. Provisional Patent Application Ser. No. 63/159,195, entitled "Asymmetric Modulation for High-Reliability 5G Communications", filed Mar. 10, 2021, and U.S. Provisional Patent Application Ser. No. 63/159,238, entitled "Selecting a Modulation Table to Mitigate 5G Message Faults", filed Mar. 10, 2021, and U.S. Provisional Patent Application Ser. No. 63/230,926, entitled "Error Detection and Correction in 5G by Modulation Quality", filed Aug. 9, 2021, and U.S. Provisional Patent Application Ser. No. 63/280,281, entitled "Error Detection and Correction in 5G by Modulation Quality in 5G/6G", filed Nov. 17, 2021, and U.S. Provisional Patent Application Ser. No. 63/281,187, entitled "Error Correction by Merging Copies of 5G/6G Messages", filed Nov. 19, 2021, and U.S. Provisional Patent Application Ser. No. 63/281,847, entitled "Retransmission of Selected Message Portions in 5G/6G", filed Nov. 22, 2021, and U.S. Provisional Patent Application Ser. No. 63/282,770, entitled "AI-Based Error Detection and Correction in 5G/6G Messaging", filed Nov. 24, 2021, all of which are hereby incorporated by reference in their entireties.

FIELD OF THE INVENTION

The disclosure includes means for correcting a corrupted wireless message.

BACKGROUND OF THE INVENTION

Transmission faults are inevitable in wireless communication, due to noise, interference, attenuation, and other distortions. Faulted messages may lead to retransmission requests and other delays. In 5G and 6G, faulted messages are detected according to an error-detection code in the message, without determining which message elements are faulted. What is needed is means for determining which resource elements of a message are faulted, and means for repairing those faults.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a user device of a wireless network to mitigate message faults, the method comprising: receiving, by the user device, a data message comprising message elements, each message element modulated according to a modulation scheme, the modulation scheme comprising amplitude modulation comprising integer Namp amplitude levels, or phase modulation comprising integer Nphase phase levels, or both; determining that the data message disagrees with an error-detection code embedded in or concatenated with the data message; for each message element, determining a modulation quality according to the amplitude modulation or phase modulation of the message element, and determining whether the modulation quality is below a predetermined threshold; if the modulation quality of at least one message element is below the predetermined threshold, transmitting a retransmission request message requesting retransmission of a portion of the data message, the portion comprising the message elements with modulation quality below the predetermined threshold; and if all of the message elements have modulation quality exceeding the predetermined threshold, transmitting a retransmission request message requesting retransmission of the entire data message.

In another aspect, there is a base station of a wireless network configured to: transmit, to a user device of the wireless network, a data message comprising message elements, each message element modulated according to a modulation scheme, the modulation scheme comprising at least one of: amplitude modulation comprising one or more predetermined amplitude levels; or phase modulation comprising one or more predetermined phase levels; or both amplitude and phase modulation; receive, from the user device, a retransmission request message specifying a portion of the data message to be retransmitted; and transmit, to the user device, the portion of the data message specified in the retransmission request message; wherein the portion comprises at least one message element with a modulation quality below a predetermined threshold, as-received by the user device.

In another aspect, there is non-transitory computer-readable media in a first mobile wireless device, the media including instructions that when executed by a computing environment cause a method to be performed, the method comprising: receiving a wireless message from a second mobile wireless device; determining, according to an error-detection code embedded in or associated with the data message, that the data message is corrupted; determining, for each message element of the data message, a modulation quality according to a received amplitude value or a received phase value of the message element; and transmitting a retransmission request message to the second mobile wireless device, the retransmission request message indicating a particular portion of the data message comprising all of the message elements having modulation quality below a predetermined threshold.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
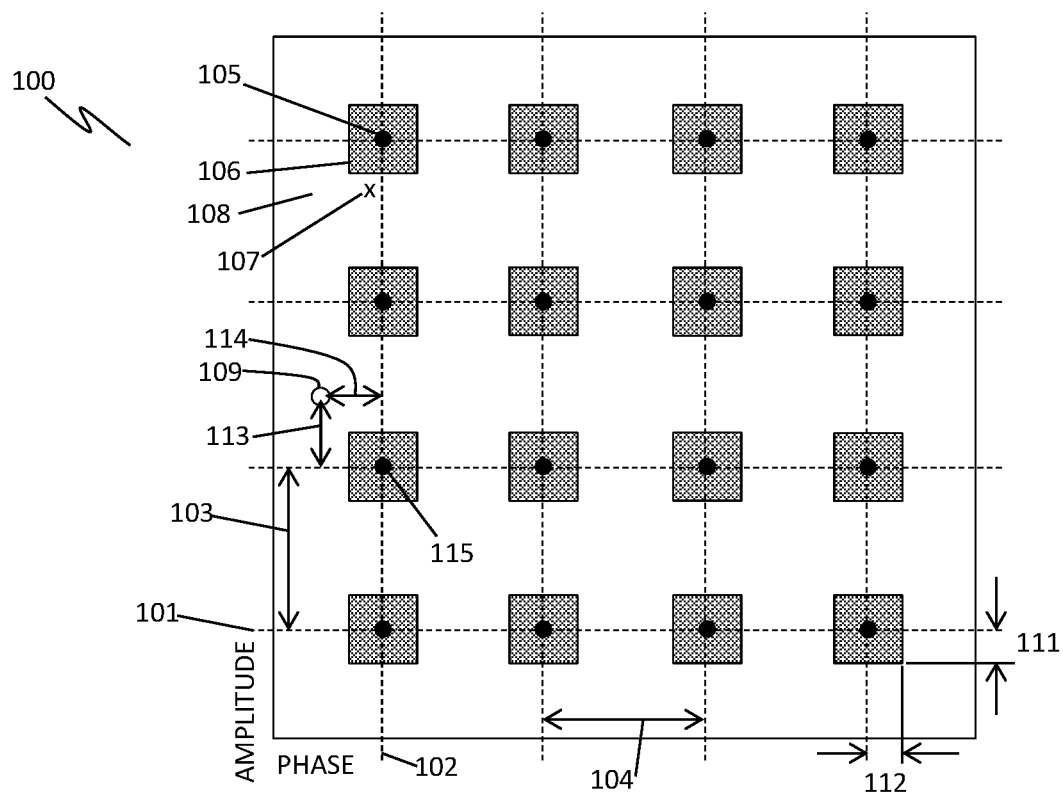
FIG. 1A is a schematic showing an exemplary embodiment of a modulation table for 16QAM, according to some embodiments.

Disclosed herein are procedures for a wireless receiver to detect, localize, and correct individual errors in a received message, thereby enhancing reliability and avoiding retransmission delays. Systems and methods disclosed herein (the "systems" and "methods", also occasionally termed "embodiments" or "arrangements", generally according to present principles) can provide urgently needed wireless communication protocols to reduce retransmission burdens, improve reliability, and reduce overall delays in networks such as 5G and 6G networks, according to some embodiments. Commonly in wireless communication, interference or noise may distort one or more message elements, resulting in a corrupted message as received. Such a message is generally rejected by the receiving entity because the message disagrees with its error-detection code (EDC), such as a CRC (cyclic redundancy code) or a parity construct. Lack of an acknowledgement then prompts a retransmission, which takes extra time and extra signaling. However, the corrupted message contains a great deal of information despite the fault, especially if the fault is restricted to one or a few resource elements, and even the faulted message elements may contain valuable information to assist in error mitigation.

Procedures are disclosed for evaluating a modulation quality of each message element based on how well the modulation matches the calibrated amplitude and phase levels of the modulation scheme. Further disclosures provide procedures for selecting a portion of a faulted message and requesting retransmission of that portion, instead of the entire message. For example, the receiver can determine which message elements are likely faulted according to a quality factor. The quality factor may be based on the modulation quality according to the deviation of the amplitude and phase modulation of the message element relative to the nearest amplitude and phase levels of the modulation scheme, as well as other factors related to noise or interference. The receiver may then request that the affected portion be retransmitted, using message formats disclosed below. The systems and methods disclosed herein can provide means for detecting one or more faulted resource elements in a message, and efficiently determining the correct value of those resource elements, thereby providing a low-latency and high-reliability solution to message fault problems, according to some embodiments.

Terms used herein generally follow 3GPP (Third Generation Partnership Project) usage, but with clarification where needed to resolve ambiguities. As used herein, "5G" represents fifth-generation and "6G" sixth-generation wireless technology. A network (or cell or LAN or local area network or the like) may include a base station (or gNB or generation-node-B or eNB or evolution-node-B or access point) in signal communication with a plurality of user devices (or UE or user equipment or nodes or terminals) and operationally connected to a core network (CN) which handles non-radio tasks, such as administration, and is usually connected to a larger network such as the Internet. "Receiver" is to be interpreted broadly, including processors accessible by the recipient and configured to perform calculations on received signals or messages. A "message" as used herein is a plurality of modulated resource elements including an embedded or appended error-detection code configured to detect errors in the message. Message fragments, transport blocks, and other types of transmission constructs that include separate error-detection codes are treated as separate messages, each message corresponding to a separate error-detection code. Embodiments may include direct user-to-user ("sidelink") communication such as V2V (vehicle-to-vehicle) communication, V2X (vehicle-to-anything), X2X (anything-to-anything, also called D2D or device-to-device) and base station communications or V2N (vehicle-to-network). "Vehicle" is to be construed broadly, including any mobile wireless communication device. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. "RNTI" (radio network temporary identity) or "C-RNTI" (cell radio network temporary identification) is a network-assigned user code. "QoS" is quality of service, or priority. "QCI" (QoS class identifier) defines various performance levels. "BPSK" (binary phase-shift keying) and "QPSK" (quad phase-shift keying) are modulation schemes with phase modulation only. "16QAM" (quadrature amplitude modulation with 16 states) is a modulation scheme with both phase and amplitude modulation, carrying four bits per message element. "SNR" (signal-to-noise ratio) and "SINK" (signal-to-interference-and-noise ratio) are treated equivalently herein.

In addition, the following terms are defined. Each modulated resource element of a message is referred to as a "symbol" in references, but this may be confused with the same term for a time interval. Therefore, each modulated reference element of a message is referred to as a "message resource element" or a "message element" in examples below. A "demodulation reference" is a set of modulated resource elements that exhibit levels of a modulation scheme (as opposed to conveying data), and each resource element of a demodulation reference is termed a "reference element" herein. A message may be configured "time-spanning" by occupying sequential symbols at a single frequency, or "frequency-spanning" on multiple subcarriers at a single symbol time (also called "frequency-first" if the message continues on multiple symbol times). An "EDC" (error-detecting code) is a field in a message configured to detect faults, such as a "CRC" (cyclic redundancy code) or a parity construct or the like. A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A device "listens" or "monitors" a channel or frequency if the device receives, or attempts to receive, signals on the channel or frequency. A message is "faulted" or "corrupted" if one or more bits of the message have been changed by noise or interference, relative to the original message. "Receptivity" is the quality of reception of a message. A "modulation scheme" is one or more predetermined amplitude modulation levels and one or more predetermined phase modulation levels, multiplexed in an array of "predetermined modulation states of the modulation scheme" or more simply "states", each state representing a resource element modulated according to one of the amplitude levels and one of the phase levels. The "amplitude deviation" of a message element is the difference between its amplitude and the closest amplitude level of the modulation scheme, and likewise the "phase deviation" of a message element is the difference between its phase and the closest phase level of the modulation scheme. The "modulation quality" is a measure of how close the modulation of a message element is to the closest amplitude and phase levels of the modulation scheme, or equivalently how close the modulation of the message element is to the closest state of the modulation scheme. Thus each state of the modulation scheme represents a resource element modulated according to one of the amplitude levels and one of the phase levels of the modulation scheme.

If one or more elements of a "subject" message have been changed from the original when received, the message fails the "EDC test", that is, the embedded error-detection code disagrees with the bit-level content of the message. The fault may have occurred during the modulation step in the transmitter, or in propagation through the air, or at the receive side, and may be due to electronic noise or external interference or atmospheric absorption or scattering or reflection of the electromagnetic wave, to name just a few possible sources of message faults. Amplitude or phase distortion can cause the receiver to incorrectly demodulate those message elements, matching them to the wrong amplitude or phase level, in which case the message fails the EDC test. Upon detecting a faulted message, the recipient in 5G or 6G can do one of several things. If the recipient knows that the message is intended for it, such as a base station that has scheduled an uplink message at a particular time or a user device with a scheduled downlink message, the recipient can request a retransmission responsive to the fault. For most downlink control messages, however, the user device does not know the time or frequency or length of a message, or even if the message is intended for that user device, because the downlink in 5G/6G generally relies on a "blind search" for user devices to locate their control messages, and a faulted message would appear as not intended for that user device. Therefore, user devices can request a retransmission after failing to receive an expected message after a certain amount of time, or by not transmitting an acknowledgement, among other options. In each case, the time involved in responding to a faulted message is substantial, especially for critical low-latency applications such as remote surgery and traffic safety.

In contrast, the disclosed systems and methods may provide message fault correction in a fraction of the time by selecting a portion of the faulted message to be retransmitted, thereby repairing the message, avoiding unnecessary retransmission delays, enhancing network reliability, and avoiding adding to the electromagnetic background, among other benefits, according to some embodiments. For example, the receiver can determine a "quality factor" of each message element according to the modulation quality, optionally the SNR, and other factors. The "modulation quality" of each message element is a measure of how far the amplitude and phase of the message element deviate from the closest amplitude and phase levels of the modulation scheme. The receiver can determine where the "suspicious" message elements are located in the message, the suspicious elements having a quality factor lower than a threshold value, and can request that just the affected portion be retransmitted. After receiving the retransmitted portion, the receiver can then merge the two versions by selecting whichever message element has the higher modulation quality, thereby eliminating most or all faulted message elements from the merged version.

The following examples disclose determining the modulation quality of each message element according to how far the modulation of the message element deviates from the amplitude and phase levels of the modulation scheme. Faulted message elements generally have a much larger deviation than correctly transmitted message elements.

FIG. 1A is a schematic showing an exemplary embodiment of a modulation table, according to some embodiments. A modulation table 100 represents the modulation levels and the states of a modulation scheme. As depicted in this non-limiting example, four amplitude levels 101 are shown as dotted horizontal lines, and four phase levels 102 are shown as dotted vertical lines. Each state of the modulation scheme is shown as a dot 105 at an intersection between one of the amplitude levels 101 and one of the phase levels 102, representing a resource element that is amplitude modulated according to that amplitude level 101 and phase modulated according to that phase level 102. The amplitude levels 101 are spaced apart by an amplitude step 103, and the phase levels 102 are spaced apart by a phase step 104. Two states that are separated by one amplitude step or one phase step, or both, are considered "adjacent" herein. Since phase is a circular parameter, the highest and lowest phase levels are separated by one phase step 104, although that may not be obvious in this type of chart.

The modulation scheme in the depicted case is 16QAM, with four amplitude levels 102 and four phase levels 103 and sixteen states indicated by dots 105. Around each state 105 is a rectangular form in dark stipple representing a "good-modulation zone" 106 (or "good-mod" in figures below) with high modulation quality. The rectangular good-modulation zones 106 include the regions defined by one of the amplitude levels 101 plus or minus a predetermined amplitude range 111, and by one of the phase levels 102 plus or minus a predetermined phase range 112. A message element that is modulated in amplitude and phase so as to occupy one of the good-modulation zones 106, is assigned to the closest state 105 of the modulation scheme, for purposes of demodulation.

The exterior white space 108 is a "bad-modulation zone" (or "bad-mod"). Message elements modulated in the bad-modulation zone 108 may be termed "suspicious" and possibly incorrect due to its low modulation quality. For example, a particular message element is modulated in amplitude and phase according to a small "x" 107 which is in the bad-modulation zone 108. Although the phase modulation of the message element x 107 is within the phase range 112 of one of the phase levels 102 of the modulation scheme, the amplitude modulation is not within the amplitude range 111 of any of the amplitude levels 101, and therefore the message element 107 has bad-modulation quality and is suspicious, although for demodulation it may be assigned to the closest state 105. The figure shows another message element's modulation, as an "o" 109, which has an amplitude deviation 113 relative to the nearest amplitude level 101, and a phase deviation 114 relative to the nearest phase level 102. The amplitude deviation 113 for this message element 109 is greater than the amplitude range 111 required for good-modulation. The phase deviation 114 is also greater than the phase range 112. Hence, the message element 109 is flagged as bad-modulation quality and suspicious. Although it may be assigned to the nearest state 115 initially, the assignment of this bad-modulation element may be altered later if the message is corrupted.

The receiver determines whether the message is corrupted by comparing the message to an error-detection code which is normally embedded in or appended to the message. If the message agrees with the error-detection code, the tentative assignment of the bad-modulation message elements is confirmed, and the message has been successfully demodulated. If not, the message has failed the EDC test, in which case the receiver may determine which portion of the message contains the suspicious elements and request a retransmission of the affected portion. If suspicious elements are distributed throughout the message, the receiver may request a retransmission of the entire message. While waiting for the retransmission, the receiver may attempt to recover the message by altering the suspicious message elements (that is, reassigning them to different states of the modulation scheme), and testing the altered message version against the error-detection code.

In some cases, the suspicious message element may happen to be one of the error-detection elements. In that case, the suspicious element is altered in the same way as any other message element. However, when determining whether the altered message is corrupted, the receiver uses the altered error-detection code (not the as-received code) to compare with the bit-level content of the rest of the message. Thus a fault in the error-detection code may be mitigated in the same way as a fault elsewhere in the message.

While the figure shows the 16QAM modulation scheme, many other modulation schemes are possible. For example, 64QAM and 256QAM involve additional phase and amplitude levels, whereas QPSK has four phase levels and only a single amplitude level. The "difference" between a modulated message element 109 and a state 105 of the modulation scheme includes a deviation in phase for QPSK, or a deviation in phase and amplitude for the QAM modulation schemes. In QPSK, demodulation of a message element includes finding which of the four states of QPSK is closest to the phase of the message element. In QAM schemes, demodulation involves selecting the amplitude level of the modulation scheme closest to the amplitude of the message element, and selecting the phase level of the modulation scheme that is closest to the phase of the message element. In each case, the methods disclosed herein for 16QAM can be applied straightforwardly to each modulation scheme, according to some embodiments.

The figure, and the other examples to follow, are presented according to a standard modulation scheme in which the amplitude and phase are modulated separately. The receiver demodulates a message by determining the amplitude and phase of each message element separately, and compares each amplitude and phase value to the amplitude and phase levels recorded in the calibration set. In other embodiments, however, the message may employ pulse-amplitude modulation (PAM), in which two amplitude-modulated signals are added with a 90-degree phase offset between them. Upon receipt, the demodulator then picks out the "real" (zero offset) and "imaginary" (90-degree offset) signals for each of the reference elements and message elements. (The two phase modulations are also sometimes called the "I" or in-phase component and the "Q" or quadrature component.) The receiver then prepares a "constellation" of modulation states from the measured real and imaginary values of the reference elements, each state having a particular real amplitude and a particular imaginary amplitude. The receiver then demodulates the message elements by comparing their real and imaginary values to the real and imaginary levels of the constellation, and thereby determines the modulation state of each message element.

Negative amplitude values correspond to a 180-degree phase rotation. For example, 16QAM with PAM modulation has four real amplitudes and four imaginary amplitudes, which are combined in each message element to yield 16 states overall. The constellation of PAM is equivalent to the calibration set of regular amplitude-phase modulation. Many other modulation technologies and schemes exist. As long as the modulation scheme involves modulating the phase and (optionally) the amplitude of an electromagnetic wave, it is immaterial which modulation technology is employed. For consistency and clarity, the examples refer to regular amplitude and phase modulation separately. The principles disclosed herein may apply to each of these modulation technologies, as will be apparent to artisans with ordinary skill in the art after reading the present disclosure.

Figure 1B:
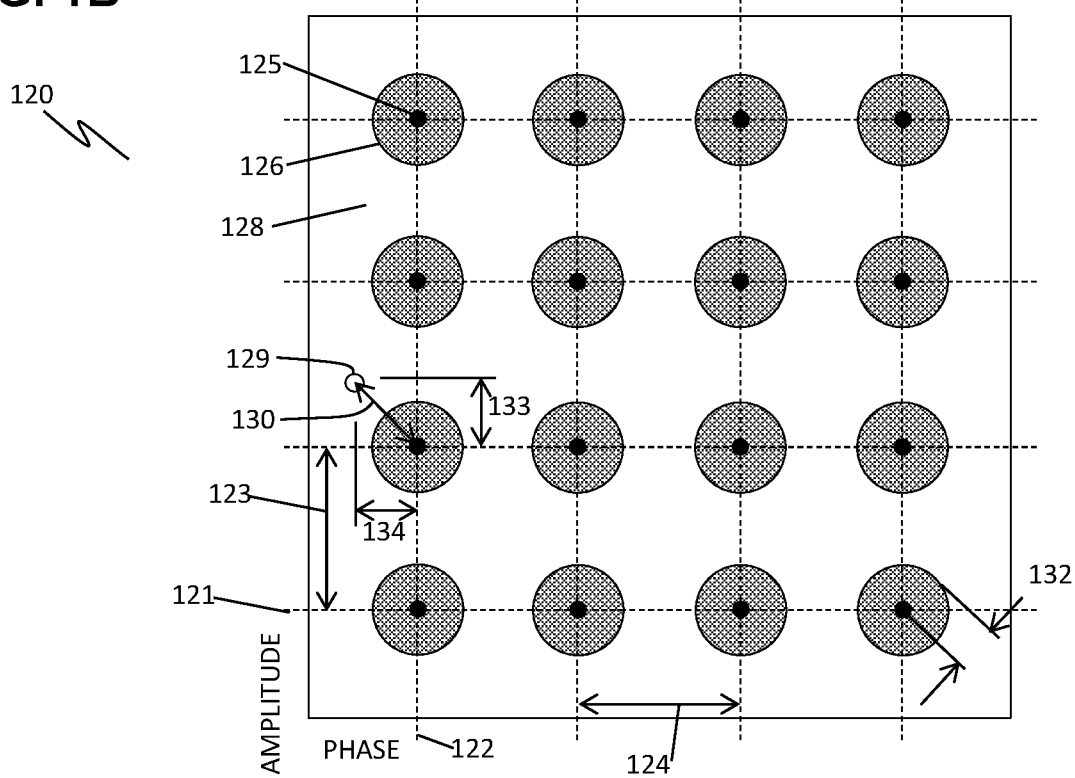
FIG. 1B is a schematic showing another exemplary embodiment of a modulation table for 16QAM, according to some embodiments.

FIG. 1B is a schematic showing another exemplary embodiment of a modulation table for 16QAM, according to some embodiments. As depicted in this non-limiting example, the modulation table 120 may include four amplitude levels 121 separated by an amplitude step 123, and four phase levels 122 separated by a phase step 124, for sixteen states 125 total. Each state 125 is surrounded in this case by a circular good-modulation zone 126, each with a radius 132 as indicated. The exterior white space 128 represents bad-modulation. A particular message element "o" 129 has an amplitude deviation 133 and a phase deviation 134, and is at a distance 130 (in phase-amplitude space) from the nearest state 125 of the modulation scheme. If that distance 130 is less than the radius 132 of the good-modulation zone, the message element 129 is assigned to the nearest state 125 and is allocated to "good-modulation quality". If the distance 130 is greater than the radius 132, then the message element 129 may still be assigned to the nearest state 125, but may be flagged as suspicious or "bad-modulation quality" for later mitigation, if needed. Thus the radius 132 of the good-modulation zones 126 is a predetermined limit or threshold separating the message elements into categories, such as high modulation quality and low modulation quality, according to the distance 130 of each message element's modulation from the closest state of the modulation scheme.

The units and dimensions of phase are generally different from those for amplitude, which may complicate calculating the distance 130. Therefore, for ease of calculation, the measurements may be made unitless by dividing each amplitude deviation 133 by the amplitude step 123, and dividing each phase deviation 134 by the phase step 124. Good-modulation quality message elements then have a distance 130, from the nearest state of the modulation scheme, less than a predetermined limit. Bad-modulation message elements have a larger distance than the predetermined limit, and are said to have a lower modulation quality. The threshold value or predetermined limit may be set empirically or theoretically, for example. In some embodiments, the threshold value or predetermined limit may be set by comparing the modulation quality of message elements that pass or fail the EDC test, and adjusting the threshold value or predetermined limit so that, on average, the worst-modulated of the message elements in the failing messages are below the limit, whereas most or all of the message elements in messages that pass the EDC test are above the limit. In other embodiments, the threshold value or predetermined limit may be adjusted up or down according to changing conditions, such as an increase or decrease in background noise or interference. In further embodiments, the threshold value or predetermined limit may be adjusted to minimize the average latency of messages, including any retransmission delays for corrupted messages, based on a sample of message latencies for example.

As mentioned, the receiver may determine which message elements are suspicious according to multiple parameters, such as the modulation quality, the signal-to-noise ratio of each message element, any anomalous amplitude variations, and other measures of distortion. The receiver may use an algorithm to determine an overall quality factor of each message element, in which the algorithm takes as input the amplitude and phase deviations, the SNR or SINR observed, and other effects. The algorithm may then provide as output, an overall quality factor or rating of each message element, or an indication of which message elements are suspicious, according to some embodiments.

Figure 2A:
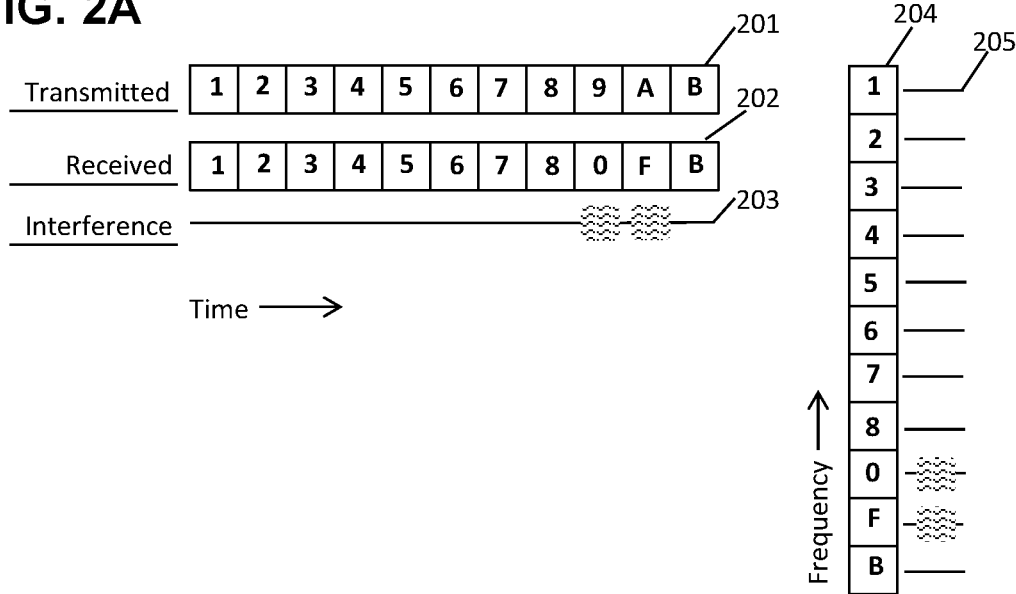
FIG. 2A is a schematic showing an exemplary embodiment of a procedure for selecting a portion of a message to retransmit, and merging the original message with the retransmitted portion, according to some embodiments.

FIG. 2A is a schematic showing an exemplary embodiment of messages with interference faults, according to some embodiments. As depicted in this non-limiting example, the original message is shown, and the same message as-received with specific faults, and a plot of the interference. A first message 201 is transmitted time-spanning, that is, occupying successive symbol times at a single frequency. Each message element is modulated according to a hexadecimal character in 16QAM. The original message is "123456789AB" as shown. The received message 202 includes two message elements changed or faulted by interference. The interference 203 is shown as a function of time, with wavy lines indicating interference when present. The received message 202 indicates that the "9" in the transmitted message 201 has been changed to a "0" by the interference 203, and the "A" has been changed to a "F".

Also shown is another message 204, in this case frequency-spanning, that is, occupying successive subcarriers at a single symbol time. Again, two of the message elements have been changed by interference to different values. Also shown is the frequency-dependent interference 205 by wavy lines opposite to the subcarriers that the interference affects. Depending on the specific modulation table involved, the interference 203 or 205 may have caused an amplitude change or a phase change or both, resulting in the incorrect demodulation of the affected message elements and hence a corrupted message. The task of the systems and methods disclosed herein may be to identify which message elements have been changed, and if possible to determine the original values of the changed message elements.

Figure 2B:
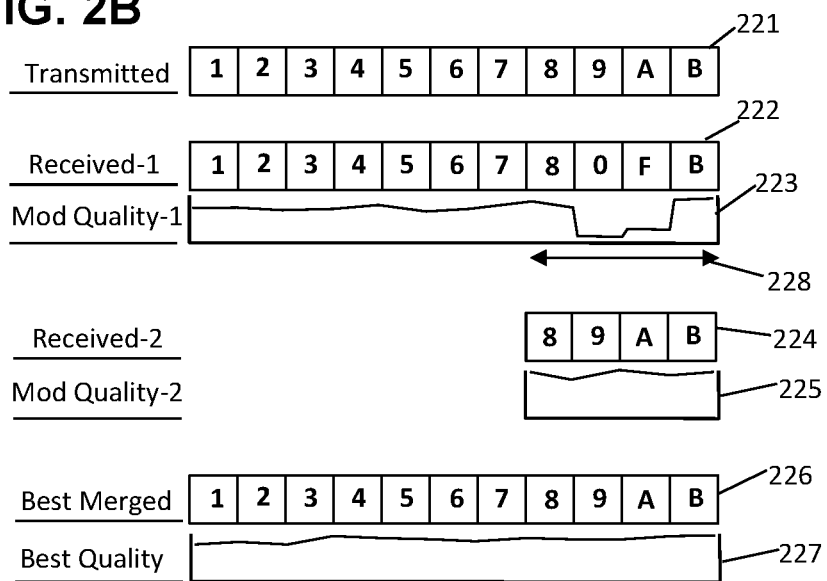
FIG. 2B is a schematic showing an exemplary embodiment of a procedure for merging messages with interference faults, according to some embodiments.

FIG. 2B is a schematic showing an exemplary embodiment of a procedure for selecting a portion of a message to retransmit, and merging the original message with the retransmitted portion, according to some embodiments. As depicted in this non-limiting example, an original message 221 ("Transmitted") is shown time-spanning, and the as-received version 222 ("Received-1") includes two incorrect characters due to noise or interference. In addition, the receiver has measured the modulation quality of each message element. For example, the modulation quality may be based on the difference between the amplitude and phase of the message element and the closest amplitude and phase levels of the modulation scheme. Alternatively, the modulation quality may be inversely related to the distance, in amplitude-phase space from the message element to the nearest state of the modulation scheme. For example, larger differences may indicate lower modulation quality. Faulted message elements are likely to have poor modulation quality, due to the random distortions caused by the interference. The line chart 223 ("Mod Quality-1") shows the modulation quality versus time, determined by the receiver while the message elements are received. All of the message elements have high modulation quality except the ninth and tenth, which have low modulation quality due to the distortion effects of interference when those message elements were received.

The receiver can determine that the received message 222 is corrupted using an appended or embedded error-detection code (not shown). According to the modulation quality 223, the receiver has determined that all of the likely faulted message elements are in the last portion, indicated as an arrow 228. The receiver has therefore requested a retransmission of that portion 228 of the message, consisting of the last four message elements in this case, since that portion 228 includes all of the message elements with low modulation quality. The receiver then received the requested portion 228 retransmitted, as shown as 224 ("Received-2"). The receiver measured the modulation quality of that received portion 224 and is shown as "Mod Quality-2", labeled 225. All four of the retransmitted message elements have high modulation quality.

To recover the original message, the receiver can merge the retransmitted message portion 224 with the first received version 222, selecting the message elements with the best modulation quality for the merged message. The merged message 226 is shown as "Best Merged", obtained by selecting whichever of the corresponding message elements of the first and second copy had the higher modulation quality. In this case, each of the faulted message elements in the Received-1 message 222 are not faulted in the Received-2 portion 224, as indicated by the modulation quality 227 ("Best Quality"). By preparing the merged message selecting the better quality version for each message element, all of the faults have been removed in the merged message 226. Therefore the merged message 226 is correct and passes the error-detection test.

Although unlikely, it is possible that the first message and the retransmitted portion may both be faulted in the same message element position, in which case the merged message will also be faulted. In that case, the receiver can try various procedures. For example, the receiver can find the "inconsistent" message elements, which are message elements that differ in the first-received version and the retransmitted portion. Inconsistent message elements indicate that noise distortions occurred in one or both of the versions. It is unlikely that random noise would distort the same message element in the same way on two successive transmissions, and therefore the "consistent" message elements may be trusted. To mitigate the continuing fault, the receiver may alter each inconsistent message element by changing its assignment to a different state of the modulation scheme, and test the altered version against the error-detection code. It may be necessary to vary the inconsistent message element across all of the states of the modulation scheme. If there are more than one inconsistent message elements, the receiver may vary them in all combinations, sometimes called a "nested search", and test each combination with the error-detection code. The receiver may have a predetermined limit, the "search limit", such that if the number of inconsistent message elements is smaller than the search limit a nested search may take less time than waiting for another retransmission.

If the merged message fails the EDC test, the receiver may select which message elements to alter according to a criterion. The criterion may include whether each message element is inconsistent, as just described. The criterion may additionally or alternatively include the modulation quality of each message element, a low modulation quality indicating probable noise effects. The modulation quality may be a value, such as the amplitude or phase deviation of the message element relative to the nearest amplitude or phase level of the modulation scheme, or the distance from the message element's modulation to the nearest state of the modulation scheme, for example. Alternatively, the modulation quality may be a category, such as good-mod, bad-mod, and (described below) marginal-mod categories, for example. The criterion may further include the SNR of the received signal during each message element, since low SNR may indicate noise or interference presence. The criterion may include anomalous changes in amplitude, such as an amplitude variation in message elements modulated according to a phase-only scheme such as BPSK or QPSK, for example. As a further test, the receiver can measure properties of the transitions between message elements, such as measuring how quickly the amplitude or phase of the message changes between message elements. If interference is present, and the timing of the interfering transmitter is different from the timing of the message transmitter, then the transitions may exhibit a step-like or distributed change in signal properties, due to the two signal sources transitioning at different times. A further test may be the flatness of the amplitude or phase of the message signal during each message element, since interference can cause time-dependent variations in the received signal. A message element exhibiting low modulation quality, low signal to noise ratio, stepped edges, and non-flat amplitude or phase may be more likely faulted than another message element with good-modulation quality, high SNR, sharp edges, and flat signal during the message element.

The receiver may include an algorithm that takes, as input, the amplitude and phase deviations of the message element relative to the closest amplitude and phase levels of the modulation scheme, and/or the distance in amplitude-phase space of the message element from the nearest state of the modulation scheme, and/or the SNR of the message element's signal, and/or anomalous variations in amplitude when none are expected, and/or the sharpness of the transitions, and/or the flatness of the signal, and/or environmental factors such as the current noise and interference levels, and/or the signal strength of the message, among other inputs. The algorithm may then provide, as output, a quality factor of each message element, such that a low quality factor renders the message element suspicious. The algorithm may be developed using artificial intelligence and/or machine learning, in some embodiments.

It may be noted that prior art methods for merging messages generally do not measure or use the modulation quality in determining the values of the merged message elements. Instead, the prior art procedures, such as "soft-combining" and related methods, generally involve averaging the raw amplitude and phase values of the received message elements, or the states they represent, and optionally weighted according to the SNR observed for each message element. However, the SNR by itself is a poor discriminant for message faulting, because the SNR is generally measured as a variation of the received signal during the symbol time. Furthermore, the statistical improvement obtained by blind averaging is at most $\sqrt{N}$, where N is the number of copies being averaged, and even this modest improvement is generally obtained only when the distortions are random and Gaussian. For common cases in which the distortions are caused by bursty and frequency-rich interference, averaging additional copies can actually increase the errors in the merged message by adding new distortions to the message elements that were originally undistorted. The disclosed procedure avoids these problems by avoiding the averaging step altogether. Instead, the disclosed methods include selecting the best message elements from the two copies according to their quality factor, which may include the SNR as well as the modulation quality, but without averaging subsequently received signals. A correctly received message element is more likely to have a high modulation quality, the improvement tends to be proportional to N, instead of $\sqrt{N}$. Embodiments of the disclosed procedure, for exploiting the modulation quality to select message elements for the merged message, can therefore provide a significant reliability improvement over soft-combining and the other signal-averaging methods, especially in high-background environments or when reception is weak, according to some embodiments.

Figure 3:
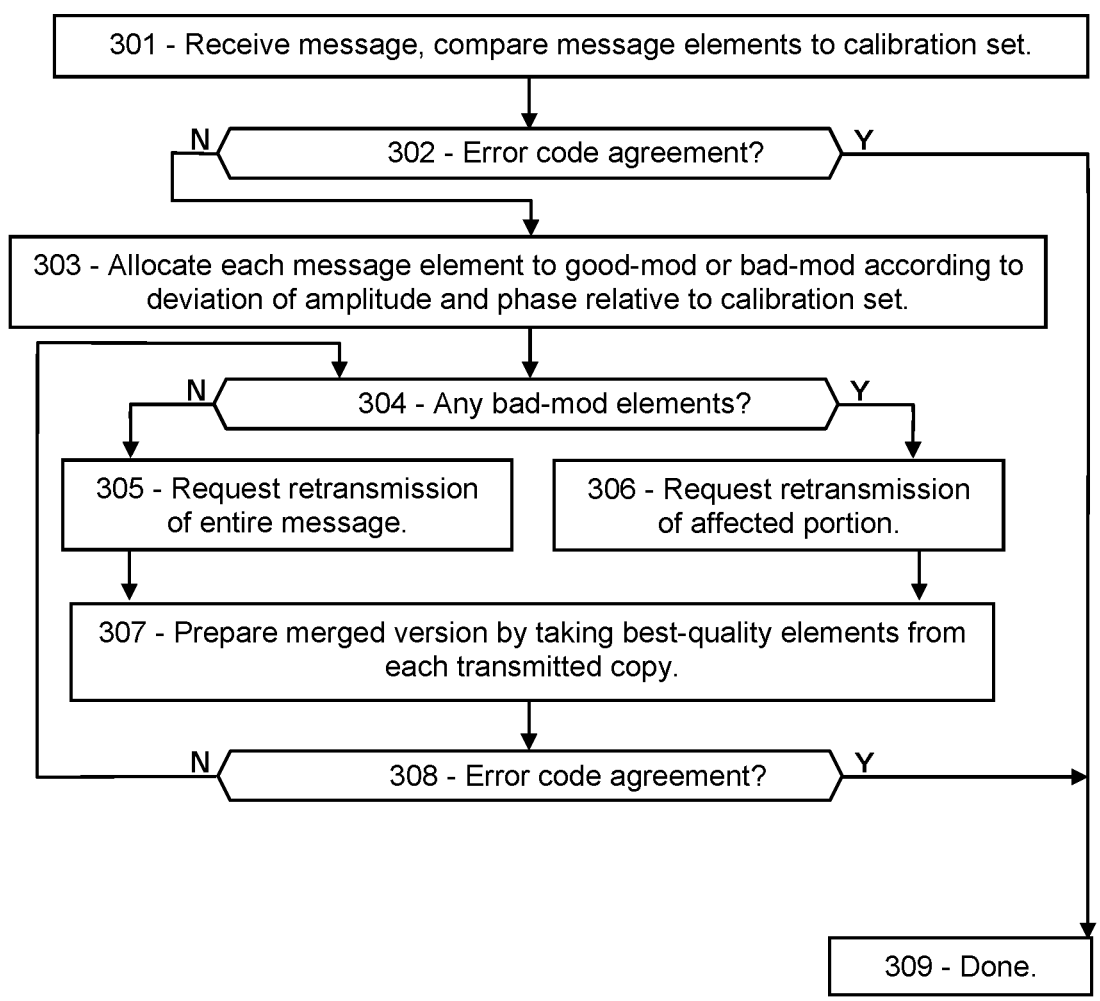
FIG. 3 is a flowchart showing an exemplary embodiment of a process for selecting a portion of a message is to be retransmitted, according to some embodiments.

FIG. 3 is a flowchart showing an exemplary embodiment of a procedure for selecting a portion of a message to be retransmitted, according to some embodiments. As depicted in this non-limiting example, at 301 a receiver receives a message and compares the amplitude and phase of the message elements to a calibration set that includes the amplitude and phase levels of the modulation scheme. At 302, the receiver compares the demodulated message to an embedded error-detection code and, if it agrees, the task is done at 309. If not, the receiver may evaluate the modulation quality of each message element at 303, categorizing each message element as good-modulation or bad-modulation according to a difference between the modulation of the message element and the nearest state of the modulation scheme. For example, the receiver can determine an amplitude deviation between the message element's amplitude and the closest amplitude level of the modulation scheme, and a phase deviation between the message element's phase and the closest phase level of the modulation scheme. The receiver may combine those two deviations, such as adding them in magnitude, or calculating a distance according to the square root of the sum of the squares of the deviations, among other combinations.

At 304, the receiver can determine whether the message includes any bad-modulation elements (or equivalently, whether any of the message elements has a combined amplitude and phase deviation greater than a threshold, or other criterion based on the message element's modulation). If there are no bad-modulation elements, the receiver may request a retransmission of the entire message at 305. If, however, the message includes one or more bad-modulation elements at 304, then the receiver may determine whether the faults occupy just a portion of the message, and may request a retransmission of that portion at 306. In either case, at 307 the receiver can merge the first-received message with the retransmitted message or portion, taking from each version the message element with better modulation quality. The receiver can then test the merged message against the error-detection code at 308, and if it agrees, the task is done. If not, the receiver can return to interrogator 304 and determine whether there are any bad-modulation elements, and continue the cycle until the message passes the EDC test. However, not shown, if the receiver runs out of retransmission opportunities, it may abandon the message.

Figure 4:
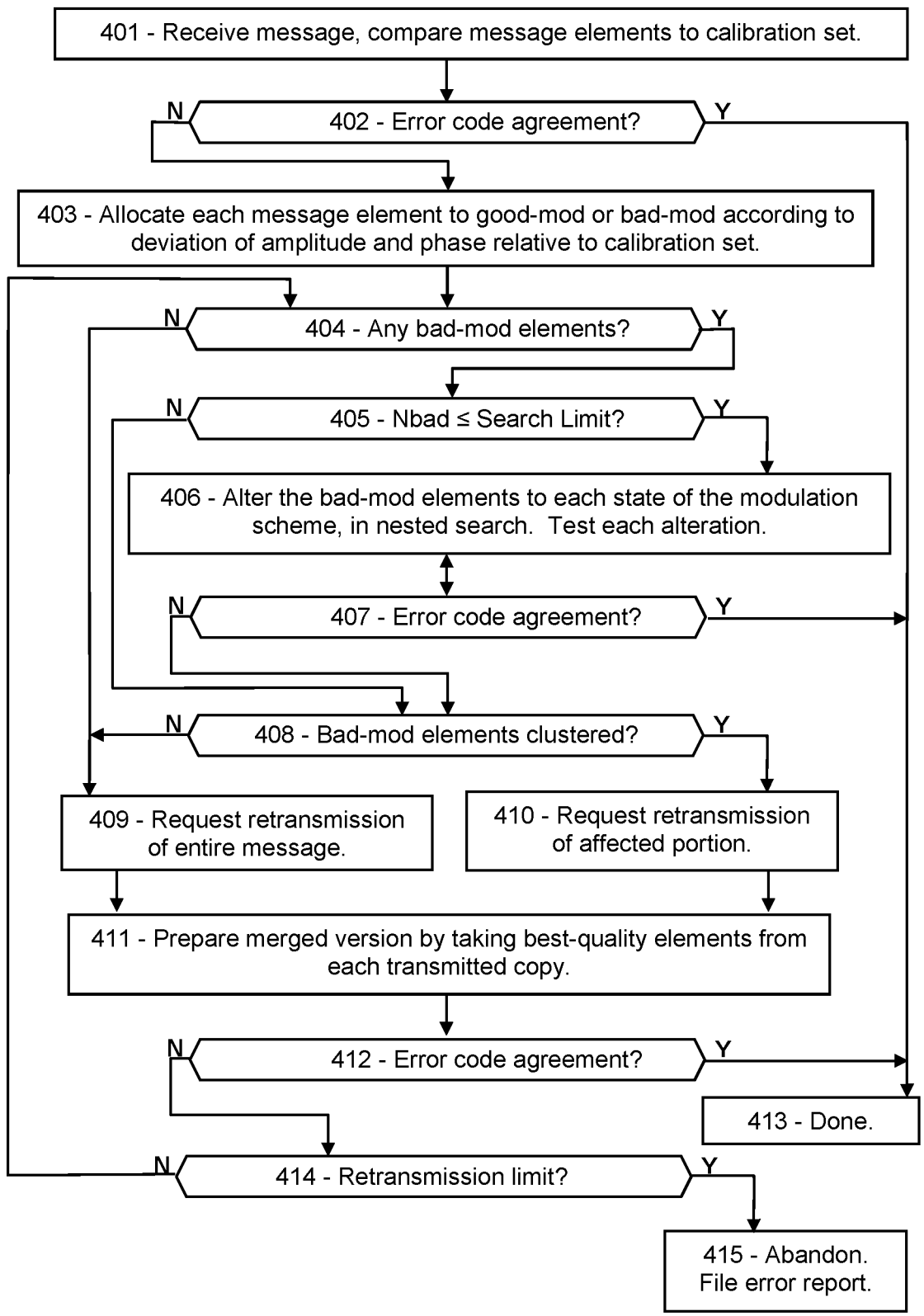
FIG. 4 is a flowchart showing another exemplary embodiment of a process for selecting a portion of a message is to be retransmitted, according to some embodiments.

FIG. 4 is a flowchart showing another exemplary embodiment of a process for selecting a portion of a message is to be retransmitted, according to some embodiments. As depicted in this non-limiting example, a receiver can process and mitigate message faults as described in the previous figure, but with more options and details. At 401, the receiver receives the message and demodulates it using the calibration set of amplitude and phase levels, then checks the error-detection code at 402. If agreed, the task is done at 413. If not, at 403 the receiver can analyze each message element's amplitude and phase deviations relative to the closest amplitude and phase levels of the modulation scheme, and allocate each message element to good-modulation or bad-modulation accordingly. At 404, the receiver determines whether there are any bad-modulation message elements, and if not, can request a retransmission of the entire message at 409. If there are bad-modulation elements, then at 405 the receiver can count them and determine whether the number of bad-modulation elements exceeds a search limit, corresponding to the maximum number of message elements that the receiver can process simultaneously in attempting to repair the message.

If the number of bad-modulation elements ("Nbad") exceeds the search limit, the receiver can drop to 408 as explained below. If not, then at 406 the receiver can attempt to find the correct demodulation values of the bad-modulation message elements in a grid-search procedure. For example, the receiver can alter the amplitude and phase assignments of the bad-modulation message elements, and test the error-detection code for each such alteration. If there is only one bad-modulation message element, the receiver can alter its amplitude and phase assignments across all of the states of the modulation scheme, testing each alteration, until finding the correct value. If there are multiple bad-modulation elements, then the receiver can alter them all in a "nested search" configured to test all combinations of all bad-modulation elements in all of the states of the modulation scheme. Each alteration is then tested at 407, and the search is aborted if any one of the alterations passes the EDC test. The double-ended arrow indicates that the two steps 406-407 are to be performed repeatedly until all combinations are exhausted or one of them passes the test.

If none of the alterations passes the test, or if the number of bad-modulation elements exceeds the search limit at 405, then at 408 the receiver can determine whether the bad-modulation elements are clustered in just a portion of the message or are distributed throughout the message. If the bad-modulation elements are not clustered, then at 409 the receiver can request a retransmission of the entire message. If they are clustered in a portion of the message, then at 410 the receiver can request a retransmission of that portion. In either case, at 411 the receiver can prepare a merged message version by selecting, from the first-received message and the retransmitted message or portion, whichever message element has a better modulation quality. The modulation quality may be a category such as good-modulation or bad-modulation, or it may be a value such as the sum of the magnitudes of the amplitude and phase deviations of the message element, or a distance of the message element's modulation from that of the nearest state of the modulation scheme, for example.

The receiver may then, at 412, test the merged message and, if it agrees with the error-detection code, the task is done. If not, then at 414 the receiver can determine whether it has reached its retransmission limit, the maximum number of times that the receiver can request a retransmission of the same message. If not, then the receiver can return to 404 and perform a similar mitigation attempt using the merged message. If the receiver has exhausted its retransmission limit, then at 415, the receiver may abandon the message and optionally file an error report, such as a message indicating that the reception is insufficient for reliable communications, for example.

The disclosed systems and methods further include assigning multiple levels of modulation quality, such as good, marginal, and bad-modulation quality, to message elements according to the amplitude and phase deviations of the message element relative to the closest amplitude and phase levels of the modulation scheme, or how far the element's modulation differs from the closest state of the modulation scheme, as described in the following examples.

Figure 5A:
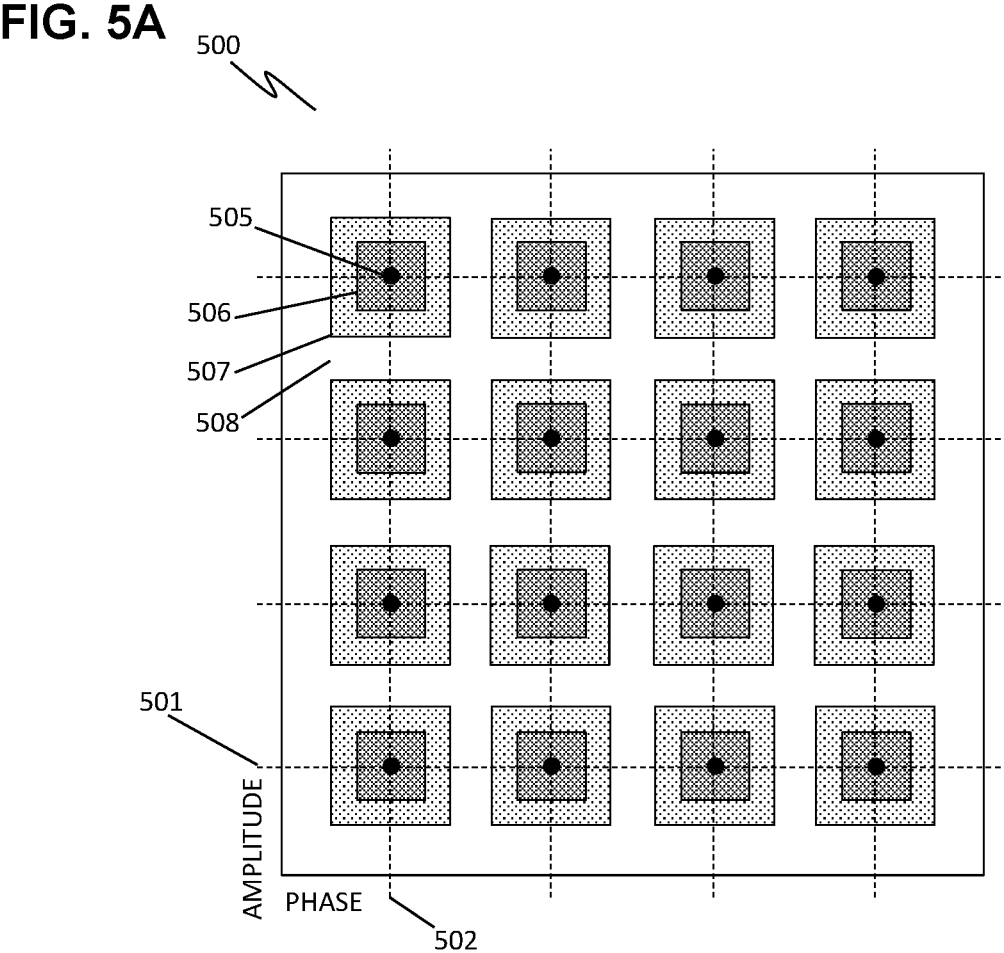
FIG. 5A is a schematic showing an exemplary embodiment of a modulation table with multiple levels of modulation quality, according to some embodiments.

FIG. 5A is a schematic sketch showing an exemplary embodiment of a modulation table with multiple levels of modulation quality, according to some embodiments. As depicted in this non-limiting example, a modulation table 500 (for 16QAM in this case) includes four amplitude levels 501, four phase levels 502, and sixteen states 505. Around each state 505 is a good-modulation zone 506 in dark stipple, surrounded by a marginal (that is, marginal quality) modulation zone 507 in light stipple, and the remaining white space 508 exterior to all the marginal-modulation zones is a bad-modulation zone. A message element with amplitude and phase modulation that occupies one of the good-modulation zones 506 may be assigned to the associated state 505 of the modulation scheme. A message element with modulation in the marginal-modulation zone 507 may also be assigned to the associated state 505, but with a flag indicating that it is suspicious due to its lower quality of fit to the states of the modulation scheme. A message element with modulation in the bad-modulation zone 508 may be assigned to the nearest state 505, but with a flag indicating that it is very suspicious. If the message is faulted, the bad-modulation elements may be altered first, to see whether any alterations may satisfy the EDC test, and if none of those variations succeeds in agreeing with the error-detection code, then the bad-modulation elements and the marginal-modulation elements may be varied together. Alternatively, if the suspicious elements (that is, the bad-modulation and marginal-modulation elements) are clustered in just a portion of the message, the receiver can request a retransmission of that portion and merge the two copies of those message elements according to their modulation quality.

Figure 5B:
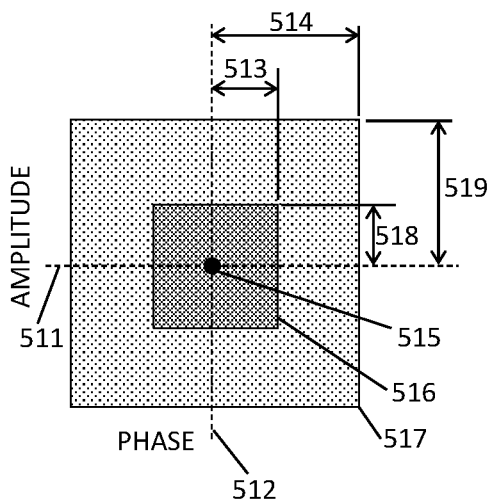
FIG. 5B is a schematic showing an exemplary embodiment of a modulation state with multiple levels of modulation quality, according to some embodiments.

FIG. 5B is a schematic sketch showing an exemplary embodiment of a single state with multiple levels of modulation quality, according to some embodiments. As depicted in this non-limiting example, a state (such as one of the states of the previous figure) may be configured as a modulation state 515 representing a message element that is amplitude-modulation according to an amplitude level 511 of the modulation scheme, and further modulated according to a phase level 512 of the modulation scheme. The state 515 is surrounded by a good-modulation zone 516 representing high quality modulation or close agreement between the message element's modulations and the amplitude and phase levels of a calibration set representing the amplitude and phase levels of the modulation scheme. The good-modulation zone 516 is surrounded by a marginal-modulation zone 517 representing modulation that matches the calibration set less closely than the good-modulation zone 516.

As depicted, each good-modulation zone 516 may be a rectangular region, defined by the associated amplitude level 511 plus or minus the amplitude range 518, and by the associated phase level 512 plus or minus the phase range 516. The marginal-modulation zone 517 may be shaped as a larger rectangular region defined by the amplitude level 511 plus or minus the larger amplitude range 519, and the phase level 512 plus or minus the larger phase range 514, exterior to the good-modulation zone 516. Message elements modulated in the good-modulation zone 516 may be assigned to the state 515 for demodulation, with high probability. Message elements modulated in the marginal-modulation zone 517 may also be assigned the closest state 515, but flagged as suspicious. Message elements modulated exterior to the marginal-modulation zones 517 may also be assigned the nearest state 515, but may be flagged as bad-modulation. If fault mitigation is needed, the receiver may start with the bad-modulation quality elements before proceeding to the marginal-modulation elements, in some embodiments.

Figure 5C:
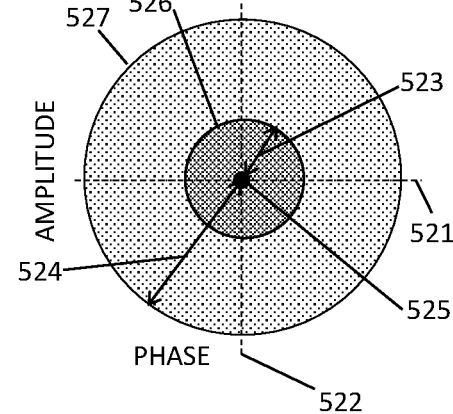
FIG. 5C is a schematic showing another exemplary embodiment of a modulation state with multiple levels of modulation quality, according to some embodiments.

FIG. 5C is a schematic sketch showing another exemplary embodiment of a single state with multiple levels of modulation quality, according to some embodiments. As depicted in this non-limiting example, a single state 525 at the intersection of an amplitude level 521 and a phase level 522 may be surrounded by a round region of good-modulation 526 which may be surrounded by an annular region of marginal quality modulation 527. The radius 523 of the good-modulation region 526 is shown, and the outer radius 524 of the marginal-modulation region 527 is shown. Thus a message element may be allocated to the good-modulation category if the amplitude and phase modulation of the element are such that the modulation falls in the good-modulation zone 526, and likewise for the marginal-modulation zone 527. For example, the "distance" of the message element from the state 525 may be calculated as the square root of the amplitude deviation squared plus the phase deviation squared. If this distance is less than the good-modulation radius 523, the message element may be allocated good-modulation quality. If the distance is greater than the good-modulation radius 523 but less than the marginal-modulation radius 524, the message element may be allocated marginal-modulation quality. If the distance is greater than the marginal-modulation radius 524, the message element may be allocated bad-modulation quality.

Figure 6:
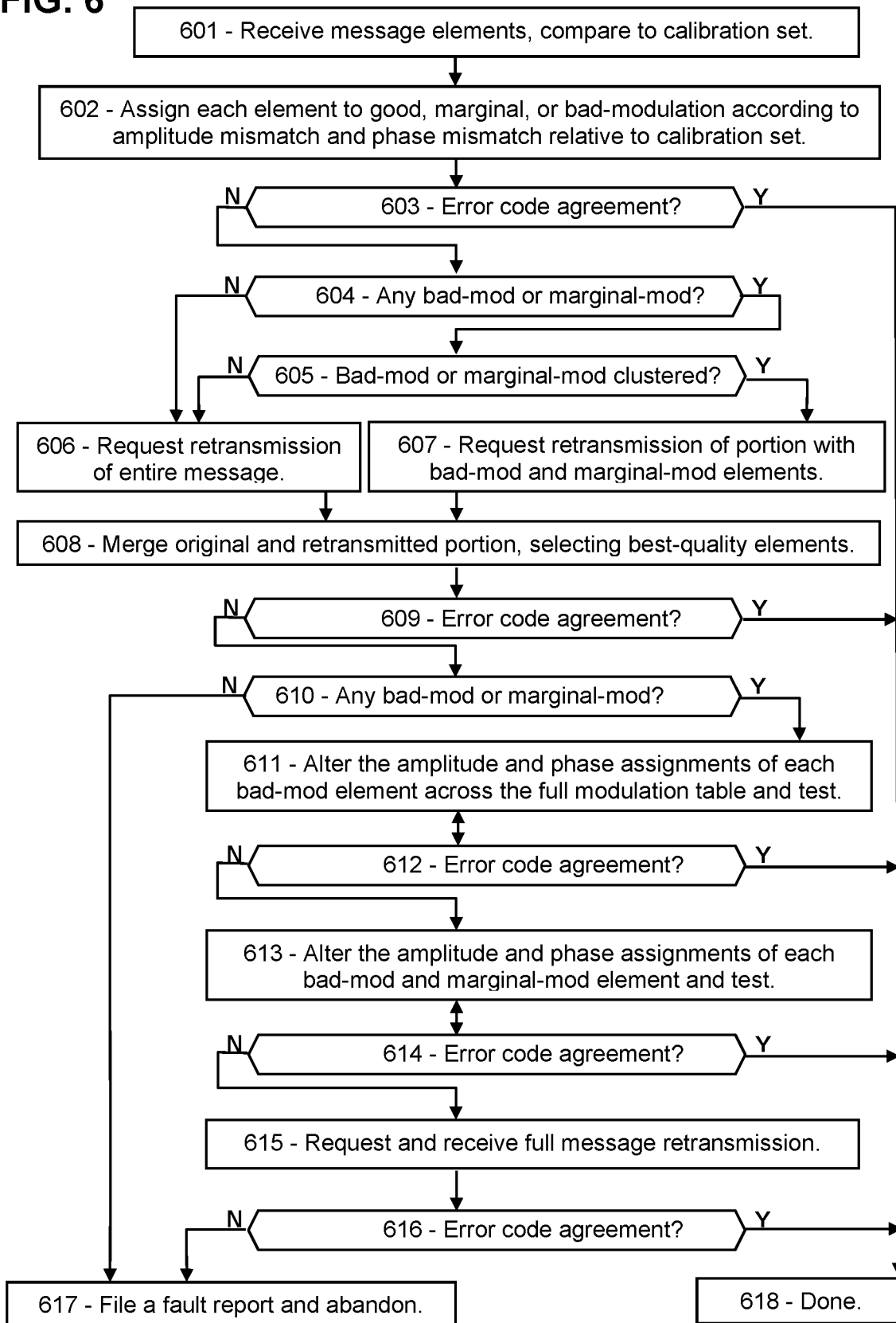
FIG. 6 is a flowchart showing an exemplary embodiment of a process for selecting a portion of a message is to be retransmitted based on multiple levels of modulation quality, according to some embodiments.

FIG. 6 is a flowchart showing an exemplary embodiment of a process for detecting and correcting message errors using multiple levels of modulation quality, according to some embodiments. As depicted in this non-limiting example, at 601 a receiver receives a message and compares each message element's amplitude and phase modulation to the amplitude and phase levels previously provided (by a demodulation reference, for example) in a calibration set. At 602, the receiver assigns each message element to the closest amplitude and phase levels of the modulation scheme, or alternatively to a corresponding state of the modulation scheme. The receiver also categorizes the message element as good, marginal, or bad-modulation quality depending on the distance, in amplitude and phase, of the message modulation to the nearest state. After attempting to demodulate the message elements, the receiver may compare the message to an error-detection code at 603. If the message agrees with the error-detection code, the task is done at 618. If not, the receiver checks at 604 whether the message contains any bad-modulation or marginal-modulation elements, and drops to 606 if not. If the message has at least one bad-modulation or marginal-modulation element, at 605 the receiver determines whether the bad-mod and marginal-mod elements are clustered, or confined to a portion of the message. If there are suspicious elements but they are not clustered, or if there are no bad or marginal-modulation elements, then at 606 the receiver requests a retransmission of the entire message. If the message has one or more bad-modulation or marginal-modulation element and they occur in a portion of the message, then at 607, the receiver requests a retransmission of that portion.

In either case, at 608 the receiver merges the two versions, using the better quality message elements, and tests it at 609. If the merged message still fails the EDC test, the receiver again determines whether any bad-modulation or marginal-modulation elements remain at 610. If all the message elements are good-modulation yet it fails the error-detection test, the receiver abandons the message at 617 and files an error report. If the merged message does still have one or more suspicious elements at 610, then at 611 the receiver alters the bad-modulation elements (if any) to each of the states of the modulation scheme and tests the altered message, as indicated by a double-arrow. If there is more than one bad-modulation element, the alterations are done as a nested search to cover all the possible state assignments of the bad-modulation elements.

If the alterations all fail the test at 612, then at 613 the receiver alters the bad-modulation and marginal-modulation elements together in a larger nested search, and tests each combination at 614. If the search continues to fail, as a last resort the receiver requests a full-message retransmission at 615 and tests it at 616. If still unsuccessful, then the receiver concludes that something is going systematically wrong and abandons at 617 with an error report.

In some embodiments, the retransmitted message message may have one or more "paradoxical" message elements. A paradoxical message element is modulated in the good-modulation zone of one state in the first message, and is modulated in the good-modulation zone of another state in the retransmitted message. This can happen if the noise and interference have caused the distorted phase and amplitude of one of the versions to, by chance, fall into another good-modulation zone. In that case, the receiver can test both versions.

In some embodiments, the receiver may determine the modulation quality as a value instead of a good-marginal-bad category, and then may vary the remaining suspicious elements according to the modulation quality starting with the message element that has the worst modulation quality, and then may proceed to vary and test the second-worst modulation quality message element, and so forth until the error-detection code matches.

In some embodiments, the amount of time required to perform the searches of 611 to 613 may exceed the amount of time to request and receive another copy of the message, in which case the receiver may request the partial or full retransmission as soon as the initial version fails the error-detection code. The receiver may already know how much time required to test the various combinations, given the number of bad and marginal-modulation elements. The receiver may use an algorithm, for example, to calculate the time required. In addition, the receiver may continue to test variations while waiting for a retransmission to be received, in case one of the variations succeeds.

The examples provided above disclosed methods for evaluating message elements based on the modulation quality. But in real communications, many factors may affect the fault rate and the types of faults likely to occur, and many other types of information may be gleaned from the message elements. For example, the likelihood that a particular message element is at fault may be determined, in part, by the SNR of the signal received because interference or noise is likely to cause the received signal to exhibit variations that can be measured by the receiver. In addition, interference from transmissions in other cells is often time-shifted due to differences in cell time-bases, signal propagation time, etc. In that case, the effects of interference may show up in the modulated signal of each message element in various ways. Detection of such time dispersion may further indicate which message elements are faulted. In addition, if a message is transmitted with a phase-only modulation scheme such as QPSK, then a message symbol with an amplitude different from the other message elements may be suspicious. The receiver may therefore calculate an overall quality factor for each message element, the overall quality factor including some combination of the modulation distance from the nearest state, the SNR, amplitude anomalies, and other measures of message element quality, for example.

The systems and methods also include procedures for a receiver to indicate which portion of a subject message should be retransmitted. Prior art includes retransmitting the entire message, which may be wasteful if the faulted message elements are clustered in just a small fraction of the message. For example, upon receiving a corrupted message, a receiver can transmit a short message termed a "retransmit portion indicator", configured to indicate which portion of the message is to be retransmitted. The retransmit portion indicator may be a separate stand-alone message, or it may be a field appended to a NACK or other message, among other configurations. The retransmit portion indicator may thereby save time and resources by avoiding retransmission of the whole message if only a portion is required. However, if the problematic elements are distributed throughout the message, then the retransmit portion indicator can indicate that the whole message is to be retransmitted, in some embodiments.

In some cases, a user device may not desire a retransmission, and may indicate so using the retransmit portion indicator. For example, a user device may have decided to abandon a message after multiple failed attempts at demodulating it, and may transmit a NACK to the base station. Normally, the base station responds to the NACK by again transmitting the message, but in this case that would be wasteful. Therefore, the retransmit portion indicator may be configured to indicate that no retransmission is requested, thereby saving resources. In addition, the base station may record a network failure when a user indicates such an abandonment. The network may analyze such events to diagnose communication problems.

In 5G/6G, acknowledgements are generally configured as standard length-12 messages modulated in a peculiar 12-phase, single-amplitude modulation scheme, which is termed "12PSK" herein. The message is generally one of the DMRS (demodulation reference signal) codes, but phase-shifted by one of 12 phases. The phase shift thereby encodes three multiplexed items: acknowledgement or non-acknowledgement of a first message, acknowledgement or non-acknowledgement of an optional second message, and an optional scheduling request in the case of uplink.

To indicate that only a portion of a message should be retransmitted, the systems and methods include appending, to the acknowledgement message, a field indicating which portion of the subject message is to be retransmitted. For compatibility, the retransmit portion indicator may be modulated in 12PSK, same as the acknowledgement indicator. When the acknowledgement refers to two subject messages in a single ACK-NACK message, the appended retransmit portion indicator may apply to whichever of the acknowledged messages is a NACK. If both of the acknowledged messages are NACKs, then the retransmit portion indicator may apply to the first NACK only. As a further option, two retransmit portion indicator codes may be appended if the acknowledgement refers to two messages and both messages are NACK.

In some embodiments, the appended retransmit portion indicator may be modulated in 12PSK, same as the acknowledgement indicator. In that case, the retransmit portion indicator has 12 modulation states (12 phases) and therefore can indicate 12 different requests. For example, each modulation state of the retransmit portion indicator may indicate a different portion of the message that contains faults, and the transmitter can retransmit that requested portion. In one version, the receiver may divide the subject message into 12 portions, and may indicate which of the one-twelfth portion is to be retransmitted. Alternatively, and more preferably, the twelve available states may be configured so that one of the states requests that the whole message be retransmitted instead of just a portion, such as when the message includes faults throughout the message. In addition, another modulation state may be used to request no retransmission at all, as in the case where the message is being abandoned. Optionally, one or two additional modulation states may be reserved for future uses, and the remaining modulation states may indicate which portion of the message is to be retransmitted.

Following are examples of a retransmit portion indicator based on the 12PSK modulation.

Figure 7A:
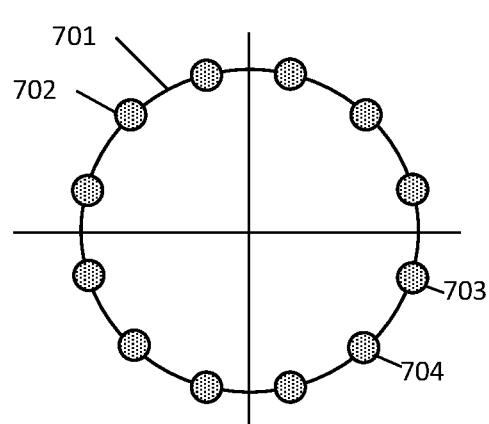
FIG. 7A is a schematic showing an exemplary embodiment of a phase chart for indicating which portion of a message is to be retransmitted, according to some embodiments.

FIG. 7A is a schematic showing an exemplary embodiment of a phase chart for acknowledgement multiplexing with 12PSK, according to some embodiments. A phase chart is a polar plot of the modulation states of a modulation scheme, with the amplitude levels shown as large circles. The radius of the large circle indicates an amplitude level of the modulation scheme. The phase levels are indicated by the angles of modulation states, relative to the horizontal axis. On the chart, each modulation state is represented by a stippled icon. In 12PSK there is only one amplitude, and it is represented by a single circle 701. The modulation states are shown as stippled icons 702 placed at 30-degree intervals around the amplitude circle 701. Each modulation state 702 may indicate which section of the message contains problematic elements. Upon receiving such a retransmit portion indicator, the indicated portion of the message can be retransmitted instead of the whole message, saving time and resources.

In some embodiments, a particular modulation state, such as the highest phase modulation state 703, may indicate that the entire message is to be retransmitted instead of just one portion. Another modulation state, such as 704, may indicate that no retransmission is desired responsive to the NACK. To be clear, the indicated modulation states 702 in a phase chart are modulation states, not bits; therefore each retransmit portion indicator includes one and only one of the states shown.

Figure 7B:
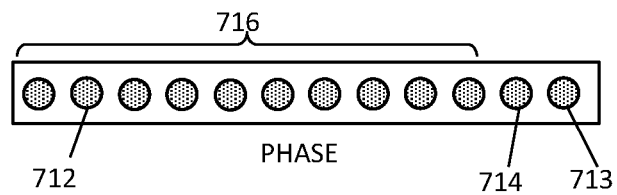
FIG. 7B is a schematic showing an exemplary embodiment of a modulation table for indicating which portion of a message is to be retransmitted, according to some embodiments.

FIG. 7B is a schematic showing an exemplary embodiment of a modulation table for 12PSK, according to some embodiments. This figure displays the same information as the previous figure, but now in the form of a modulation table with phase horizontally and amplitude vertically. As depicted in this non-limiting example, the twelve modulation states of 12PSK include phases separated by a 30-degree phase step, at a constant amplitude, thus making twelve phase levels and only one amplitude level. Each modulation state is shown as a stippled icon 712 at a different phase modulation. If a receiver receives a message that disagrees with its included error-detection code, and the message contains one or more elements with low modulation quality, then the depicted retransmit portion indicator may instruct the transmitting entity to retransmit the indicated portion of the message.

For example, the receiver may receive a message and determine whether the message agrees with its error-detection code, and if so, it transmits an ACK and is done. If the message does not agree with its error-detection code, the receiver may determine the modulation quality of each message element. The receiver may divide the subject message into a number of portions, and may determine in which portion each suspicious element is located. If all of the suspicious elements are located in one of the portions, the receiver may append the retransmit portion indicator, as a single 12PSK resource element, to the 5G acknowledgement message, and may thereby instruct the transmitting entity to retransmit only the portion containing errors.

In some embodiments, the retransmit portion indicator may be configured to indicate ten portions of the message, one portion represented by each of the first ten phase levels. The last two phase modulation states are used to request a retransmission of the message in entirety (phase 713) or to request that no retransmission occur at all (phase 714). The other ten modulation states 716 indicate which one-tenth portion of the message contains the problematic elements, so the transmitter can retransmit just that portion of the message. The receiver and the transmitter may have previously agreed as to the format and meaning of the various states of the retransmit portion indicator, via convention for example.

Figure 7C:
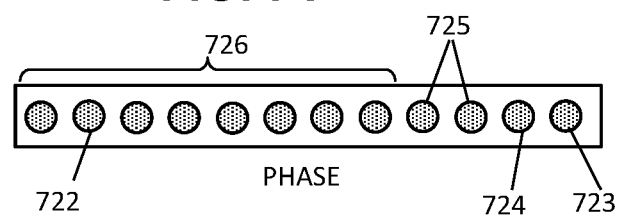
FIG. 7C is a schematic showing an exemplary embodiment of another modulation table for indicating which portion of a message is to be retransmitted, according to some embodiments.

FIG. 7C is a schematic showing another exemplary embodiment of a modulation table for 12PSK, according to some embodiments. As depicted in this non-limiting example, a receiver may receive a message and determine where the problematic elements are located. The receiver may transmit a retransmit portion indicator to the transmitting entity in place of an acknowledgement, or it may append a retransmit portion indicator to an acknowledgement message, in either case directing the transmitter to take an action. The retransmit portion indicator may be modulated according to the depicted modulation table, in which the twelve modulation states 722 include one modulation state 723 configured to indicate that the full message is to be retransmitted, another modulation state 724 indicating that no retransmission is needed, two other modulation states 725 reserved for future uses, and eight remaining modulation states 726 indicating which portion, of eight portions of the message, should be retransmitted.

Figure 7D:
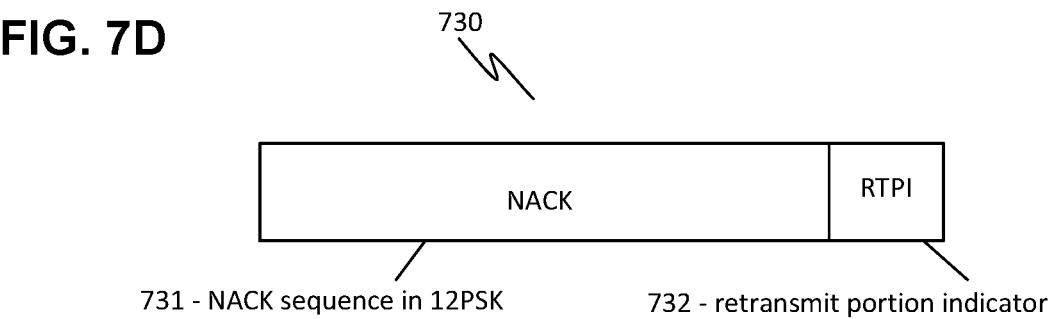
FIG. 7D is a schematic showing an exemplary embodiment of a message for indicating which portion of a message is to be retransmitted, according to some embodiments.

FIG. 7D is a schematic showing an exemplary embodiment of a message 730 including an acknowledgement and a retransmit portion indicator, according to some embodiments. As depicted in this non-limiting example, a 5G/6G acknowledgement message 731, configured to express negative acknowledgement or NACK in this case, is provided. Appended to the negative acknowledgement message 731 is a retransmit portion indicator 732 ("RTPI"). The acknowledgement portion 731 and the RTPI 732 are modulated in 12PSK. The retransmit portion indicator 732 may be a single modulated resource element in 12PSK, in some embodiments. The retransmit portion indicator 732 may be configured to indicate, to a transmitting entity, whether to retransmit the entire message, or no retransmission, or just one specified portion, according to the modulation state of the retransmit portion indicator 732. The transmitting entity, upon receiving the depicted acknowledgement message including the retransmit portion indicator 732, may then perform the requested action, such as retransmitting a particular portion of the message. The receiver and the transmitter may have already agreed as to how the retransmit portion indicator is to be interpreted. For example, in a particular embodiment, the message may include integer E message elements and the retransmit portion indicator may be configured to select one of P different portions of the subject message. Then each of the first P−1 portions may include E/P message elements (rounding down), while the final portion may then include all of the remaining message elements. Many other, equivalent ways of determining the portions are possible and envisioned.

The systems and methods further include a shorter and simpler acknowledgement message that includes a retransmit portion indicator, yet is modulated in a standard modulation scheme such as QPSK or 16QAM, as described in the following examples. In contrast to the foregoing examples, in which the retransmit portion indicator is modulated in 12PSK, the following examples disclose retransmit request messages using a standard modulation scheme such as QPSK or 16QAM.

Figure 8A:
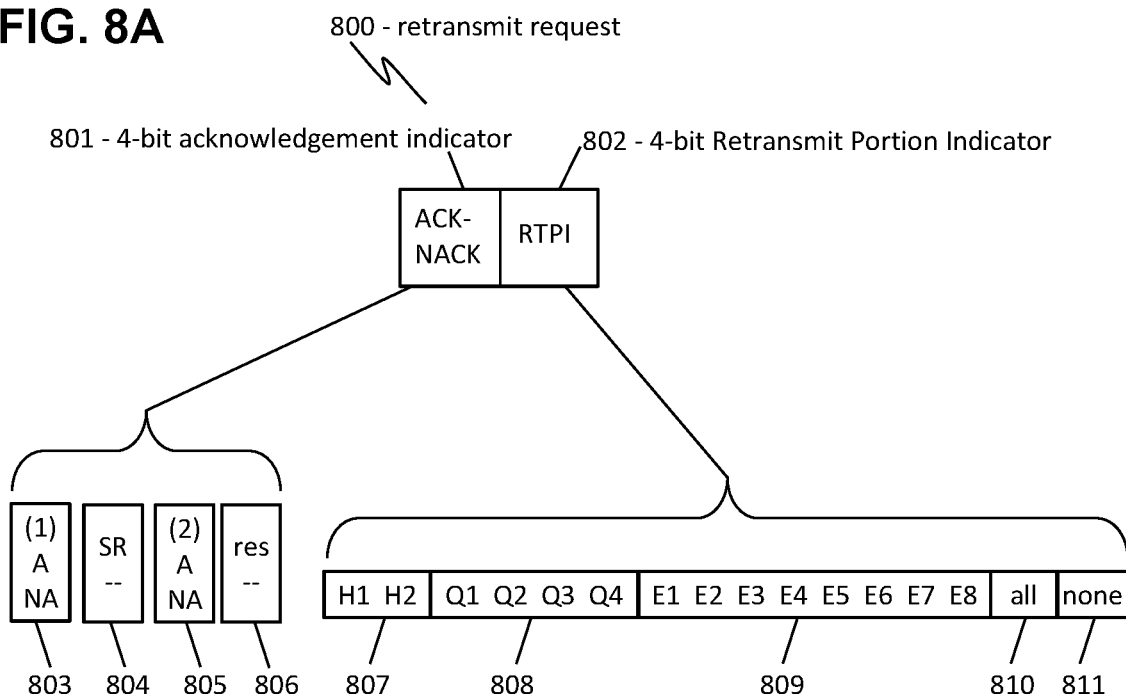
FIG. 8A is a schematic showing an exemplary embodiment of a message including an acknowledgement and an indication of which portion of a message is to be retransmitted, according to some embodiments.

FIG. 8A is a schematic showing an exemplary embodiment of an 8-bit retransmit request message configured as an acknowledgement message including a retransmit portion indicator, according to some embodiments. As depicted in this non-limiting example, a retransmit request message 800 may include a 4-bit portion 801 providing positive or negative acknowledgement (ACK-NACK) for up to two subject messages as well as an optional scheduling request. The retransmit portion indicator 802 may also be 4 bits, configured to indicate which portion of the subject message is to be retransmitted. In this example, the acknowledgement field 801 may include a first bit 803 indicating whether the first subject message is faulted (ACK-NACK abbreviated as "(1) A NA"), a second bit 804 indicating whether an optional scheduling request ("SR-") is included, a third bit 805 indicating whether a second subject message is faulted ("(2) A NA"), and a fourth bit 806 ("res-") which may be reserved for future uses. Alternatively, the fourth bit 806 may indicate which subject message the retransmit portion indicator 802 applies to, in event of an ambiguity, for example.

The 4-bit retransmit portion indicator 802 may encode 16 modulation states, configured to indicate a request to the transmitting entity. For example, two of the modulation states 807 may indicate that the transmitting entity is to retransmit the first half (H1) or the second half (H2) of the subject message, in situations where the faults are clustered in the first or second half of the message. Four more modulation states 808 may indicate whether the transmitting entity is to retransmit just a quarter of the subject message, and if so, which quarter. The next eight modulation states 809 may indicate which eighth portion of the subject message is to be retransmitted, assuming the problematic element(s) is/are in the corresponding one-eighth portion of the subject message. One modulation state 810 may indicate that the transmitting entity is to retransmit the entire subject message, and another modulation state 811 may indicate that no retransmission is needed. Thus the 8-bit retransmit request 800 (four QPSK resource elements or two 16QAM elements) may provide the same information as the length-12 acknowledgement of 5G/6G, including positive and negative acknowledgements to two subject messages, plus an optional scheduling request, plus, a reserved bit, plus a detailed and versatile indication of which portion of the subject message is to be retransmitted. This compact code may thereby save time and resources.

Figure 8B:
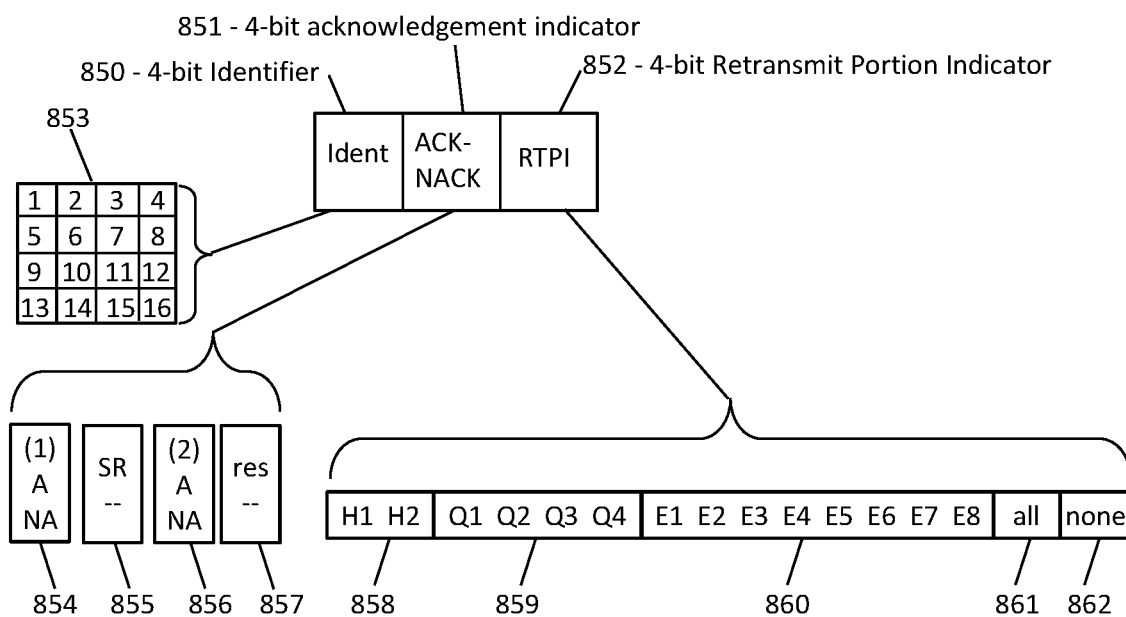
FIG. 8B is a schematic showing another exemplary embodiment of a message including an acknowledgement and an indication of which portion of a message is to be retransmitted, according to some embodiments.

FIG. 8B is a schematic showing an exemplary embodiment of a 12-bit acknowledgement message including an identification section and a retransmit portion indicator, according to some embodiments. As depicted in this non-limiting example, an identifier 850 is included (prepended in this example) with the acknowledgement indicator 851. The identifier 850 is a short code that identifies which message, of several messages in play, is being acknowledged. In this case, the identifier 850 is a 4-bit (2 resource element at QPSK) code. The 4 bits represent a number in the range of 1-16 (or equivalently 0-15) matching an identifying code previously selected by the entity that transmitted the subject message and included in the subject message, or otherwise conveyed to the receiver. The purpose of the identifier 850 is to resolve ambiguities when traffic is heavy and numerous user devices are competing for bandwidth or transmitting acknowledgements. The identifier 850 thereby identifies which of those active user devices is sending the present acknowledgement, and hence which of the previously transmitted downlink messages is being acknowledged. In this way, the identifier 850 avoids confusion or misappropriation of the acknowledgement. Four bits may be sufficient because it is unlikely that more than 16 users would be acknowledging in the same time slot and the same resource block. Accordingly, the expanded depiction 853 of the identifier portion 850 shows 16 possible codes for 4 bits. The base station, upon matching the identifier code to its previously selected code, then can determine which subject message is being acknowledged.

The 4-bit acknowledgement indicator 851 is also 4 bits in this example. The acknowledgement indicator 851 is shown expanded as 854, 855, 856, 857. The four bits thereby indicate the ACK-NACK status of two subject messages, an optional scheduling request, and a reserved bit as shown.

The retransmit portion indicator 852 is also 4 bits, configured to encode 16 modulation states. As shown, the 16 modulation states represent a request for retransmission of a first or second half 858 ("H1" or "H2") of the subject message, or one of four quarters 859, or one of eight eighths 860, plus a modulation state indicating to retransmit the entire subject message 861, and another modulation state 862 for suppressing the retransmission.

The systems and methods disclosed herein further include short-form acknowledgement messages. These are very brief. Each acknowledgement is configured to acknowledge just one subject message (the most common situation) and optionally to submit a scheduling request or a retransmit portion indicator, as shown in the following examples.

Figure 9A:
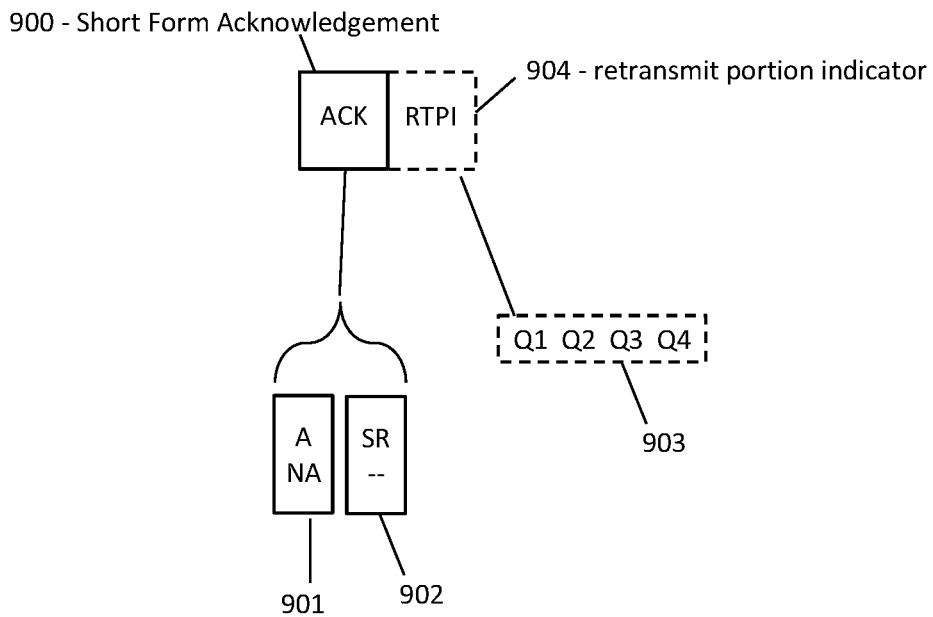
FIG. 9A is a schematic showing another exemplary embodiment of a message including an acknowledgement and an indication of which portion of a message is to be retransmitted, according to some embodiments.

FIG. 9A is a schematic showing an exemplary embodiment of a short form acknowledgement message of length one QPSK resource element, according to some embodiments. As depicted in this non-limiting example, the short form acknowledgement message 900 includes two modulated bits in a single QPSK element, plus options. The first bit 901 indicates whether the subject message is a positive or negative acknowledgement (represented symbolically as "A NA"), and the second bit 902 indicates whether an SR scheduling request is desired. The short form acknowledgement 900 exploits the fact that most messages are successfully received most of the time, and most acknowledgements pertain to a single subject message. Therefore, the depicted short acknowledgement message 900 is sufficient for most acknowledgement situations. The brevity of the acknowledgement message (just one resource element) makes it unlikely to collide with other messages, and also saves time and resources.

If, however, the response is a NACK, then an optional retransmit portion indicator 904 may be included, indicating which portion of the subject message is to be retransmitted. For example, the retransmit portion indicator 904 may be two bits, thereby indicating which quarter 903 of the subject message is to be retransmitted. If the acknowledgement 901 is a NACK and the retransmit portion indicator 904 is omitted, then the entire subject message is to be retransmitted. Thus the short-form acknowledgement 900 conveys sufficient information for most messaging situations while occupying such a small resource space (just one QPSK resource element for most cases, or two resource elements for a NACK) that a collision may be unlikely and interference with other cells may be avoided.

Figure 9B:
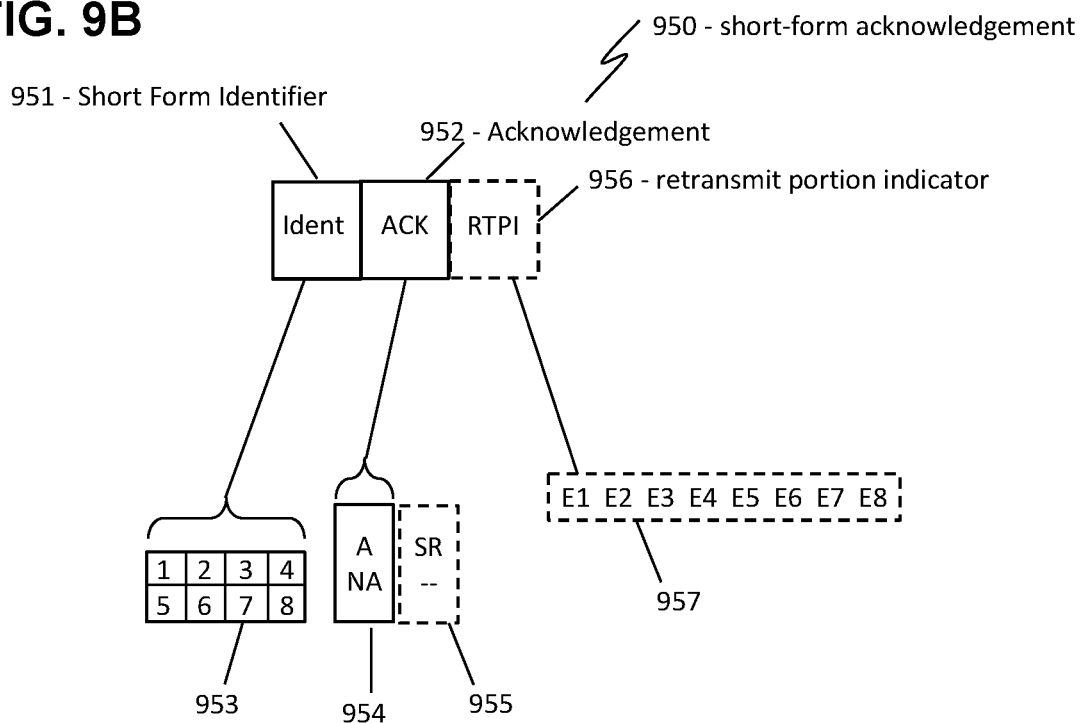
FIG. 9B is a schematic showing yet another exemplary embodiment of a message including an acknowledgement and an indication of which portion of a message is to be retransmitted, according to some embodiments.

FIG. 9B is a schematic showing an exemplary embodiment of a short form acknowledgement message including an identifier portion, according to some embodiments. As depicted in this non-limiting example, a short form acknowledgement message 950 may include an identification field 951 and an acknowledgement field 952. The acknowledgement can indicate which of several concurrent messages is the subject message, according to an identifier 951, which in this case is a 3-bit field of the retransmit request 950, the three bits thereby specifying one of eight codes as shown in the detail view 953. The base station (or other transmitting entity) may have included that same code in the subject message, or may have informed the receiver of its selected code otherwise, so that the receiver can indicate which subject message is being responded to, by including the code 953 in the acknowledgement 950 as shown. After the identifier field 951 is a short acknowledgement field 952, which in this case is just one bit 954, the fourth bit of the message, thereby indicating whether the response is a positive or negative acknowledgement. The 4-bit short-form acknowledgement message may be conveyed as two resource elements in QPSK or a single resource element in 16QAM, thereby conveying both the acknowledgement status and the identification code of the subject message.

Optionally, in dash, a fifth bit may be included, indicating whether a scheduling request 955 is needed, as shown appended to the acknowledgement 954.

Optionally, in dash, a retransmit portion indicator 956 may be added when the acknowledgement 954 is a NACK, thereby indicating which portion of the subject message is to be retransmitted. A NACK without the retransmit portion indicator 956 may indicate that the entire message is to be retransmitted. In the example, the retransmit portion indicator is 3 bits, indicating which eighth 957 of the subject message is to be retransmitted. With all options included, the total size is 8 bits, which may be encoded in four QPSK elements or two 16QAM elements.

In summary, a receiver can determine that a received message is corrupted, fail to resolve the error by variations, determine that the faults lie in just a portion of the message according to their modulation quality, and request that the problematic portion be retransmitted instead of the whole message, thereby saving time and resources. A variety of configurations for the retransmit portion indicator are possible, specifying the portion according to various fractional parts of the message, within a compact format. Other formats for the acknowledgement, optionally with a scheduling request or an identifier or a retransmit portion indicator, are also disclosed, many occupying just two or three or four QPSK message elements, and thereby evading interference under most circumstances.

Networks implementing the disclosed procedures, including a retransmit portion indicator, may thereby save time, reduce unnecessary delays, save energy, reduce complexity, conserve resources, avoid generating extra interference to neighboring cells, sharpen and simplify the response to message faults, and improve network operations overall, according to some embodiments.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file—storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a user device of a wireless network to mitigate message faults, the method comprising:
   a. receiving, by the user device, a data message comprising message elements, each message element modulated according to a modulation scheme, the modulation scheme comprising amplitude modulation comprising integer Namp amplitude levels, or phase modulation comprising integer Nphase phase levels, or both;
   b. determining that the data message disagrees with an error-detection code embedded in or concatenated with the data message;
   c. for each message element, determining a modulation quality according to the amplitude modulation or phase modulation of the message element, and determining whether the modulation quality is below a predetermined threshold;
   d. if the modulation quality of at least one message element is below the predetermined threshold, transmitting a retransmission request message requesting retransmission of a portion of the data message, the portion comprising the message elements with modulation quality below the predetermined threshold; and
   e. if all of the message elements have modulation quality exceeding the predetermined threshold, transmitting a retransmission request message requesting retransmission of the entire data message.

2. The method of claim 1, wherein the data message complies with 5G or 6G technology.

3. The method of claim 1, wherein the modulation scheme comprises at least one of:
   a. PSK (phase-shift keying) wherein Nphase equals 2 or 4;
   b. QAM (quad amplitude modulation with classical amplitude and phase modulation), wherein Nphase equals Namp; or
   c. PAM (pulse-amplitude modulation) wherein each message element comprises an I-branch added to an orthogonal Q-branch, wherein the I-branch and the Q-branch are amplitude modulated according to the Namp amplitude levels.

4. The method of claim 1, further comprising at least one of:
   a. for each message element, determining an amplitude difference comprising a difference between an amplitude value of the message element and a closest amplitude level of the modulation scheme; and
   b. for each message element, determining a phase difference comprising a difference between a phase value of the message element and a closest phase level of the modulation scheme.

5. The method of claim 4, wherein the determining the modulation quality comprises:
   a. for each message element, computing a magnitude or square of the amplitude difference or the phase difference, thereby obtaining one or more positive differences; and
   b. computing the modulation quality inversely related to the positive differences, such that a higher modulation quality corresponds to smaller positive differences, and a lower modulation quality corresponds to larger positive differences.

6. The method of claim 4, wherein the determining the modulation quality comprises
   a. for each message element, computing a magnitude or square of the amplitude difference or the phase difference, thereby obtaining one or more positive differences;
   b. determining a signal-to-noise ratio of the message element; and
   c. computing the modulation quality according to a formula that takes, as input, the positive differences and the signal-to-noise ratio, and produces, as output, a value of the modulation quality of the message element.

7. The method of claim 1, wherein:
   a. the retransmission request message comprises a single resource element concatenated with a non-acknowledgement message;
   b. the retransmission request message comprises a resource element modulated according to phase-shift keying comprising 12 phase levels of modulation;
   c. one of the phase levels indicates that the entire data message is to be retransmitted;
   d. one of the phase levels indicates that the data message is not to be retransmitted; and
   e. at least 8 of the phase levels indicate which fractional portion of the data message is to be retransmitted.

8. The method of claim 1, wherein:
   a. the retransmission request message is modulated according to a modulation scheme comprising 6 modulation states, each modulation state comprising a particular amplitude or a particular phase or a particular amplitude-phase combination;
   b. two of the modulation states correspond to retransmitting a first half and a second half of the data message, respectively; and
   c. four of the modulation states correspond to retransmitting a first, second, third, and fourth quarter of the data message, respectively.

9. The method of claim 1, wherein:
   a. the data message comprises an identification code number in the range of 1-16 or 0-15; and
   b. the retransmission request message indicates the identification code number.

10. The method of claim 1, wherein the retransmission request message comprises:
    a. a first bit indicating non-acknowledgement;
    b. a second bit indicating whether a scheduling request is requested; and
    c. a third bit and a fourth bit configured to indicate which quarter of the data message is to be retransmitted.

11. The method of claim 1, further comprising:
a. receiving, responsive to the retransmission request message, a retransmitted portion of the data message, the retransmitted portion comprising retransmitted elements, each retransmitted element corresponding to one of the message elements, respectively;
b. determining the modulation quality of each retransmitted element;
c. for each retransmitted element, if the modulation quality of the retransmitted element is higher than the modulation quality of the corresponding message element of the data message, modifying the data message by replacing the corresponding message element of the data message with the retransmitted element; and
d. determining whether the modified data message agrees with the error-detection code.

12. A base station of a wireless network configured to:
a. transmit, to a user device of the wireless network, a data message comprising message elements, each message element modulated according to a modulation scheme, the modulation scheme comprising at least one of:
   i. amplitude modulation comprising one or more predetermined amplitude levels; or
   ii. phase modulation comprising one or more predetermined phase levels; or
   iii. both amplitude and phase modulation;
b. receive, from the user device, a retransmission request message specifying a portion of the data message to be retransmitted; and
c. transmit, to the user device, the portion of the data message specified in the retransmission request message;
d. wherein the portion comprises at least one message element with a modulation quality below a predetermined threshold, as-received by the user device.

13. The base station of claim 12, wherein:
a. the retransmission request message comprises a single resource element modulated according to a phase-shift keying modulation scheme comprising 12 phase levels; and
b. each phase level of the modulation scheme corresponds to a different portion of the data message.

14. The base station of claim 12, wherein:
a. the retransmission request message further comprises, or is concatenated with, a non-acknowledgement message.

15. The base station of claim 12, wherein the retransmission request message comprises:
a. two bits corresponding to a first half and a second half of the data message, respectively;
b. four bits corresponding to a first, second, third, and fourth quarter of the data message, respectively; and
c. eight bits corresponding to each of eight portions, each portion corresponding to one-eighth of the data message, respectively.

16. The base station of claim 12, wherein the retransmission request message further comprises:
a. a first acknowledgement or non-acknowledgement;
b. a second acknowledgement or non-acknowledgement;
c. a scheduling request; and
d. a reserved bit.

17. The base station of claim 12, wherein the retransmission request message further comprises at most four bits and includes a non-acknowledgement, a scheduling request, and an indication of which quarter, of four quarters of the data message, is to be retransmitted.

18. Non-transitory computer-readable media in a first mobile wireless device, the media including instructions that when executed by a computing environment cause a method to be performed, the method comprising:
a. receiving a wireless message from a second mobile wireless device;
b. determining, according to an error-detection code embedded in or associated with the data message, that the data message is corrupted;
c. determining, for each message element of the data message, a modulation quality according to a received amplitude value or a received phase value of the message element; and
d. transmitting a retransmission request message to the second mobile wireless device, the retransmission request message indicating a particular portion of the data message comprising all of the message elements having modulation quality below a predetermined threshold.

19. The media of claim 18, wherein the retransmission request message includes or is concatenated with a non-acknowledgement message.

20. The media of claim 18, wherein the retransmission request message includes a bit that, when set, indicates that the data message is not to be retransmitted.

* * * * *